United States Patent
Yao et al.

(10) Patent No.: US 11,832,193 B2
(45) Date of Patent: Nov. 28, 2023

(54) POWER CONTROL METHOD AND DEVICE, AND METHOD AND DEVICE FOR DETERMINING TARGET RECEIVING POWER

(71) Applicant: ZTE Corporation, Guangdong (CN)

(72) Inventors: Ke Yao, Shenzhen (CN); Bo Gao, Shenzhen (CN); Zhaohua Lu, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/171,796

(22) Filed: Feb. 9, 2021

(65) Prior Publication Data
US 2021/0235389 A1  Jul. 29, 2021

Related U.S. Application Data

(63) Continuation of application No. PCT/CN2019/099751, filed on Aug. 8, 2019.

(30) Foreign Application Priority Data

Aug. 10, 2018 (CN) .......................... 201810910283.1
Sep. 14, 2018 (CN) .......................... 201811076580.1

(51) Int. Cl.
*H04W 52/24* (2009.01)
*H04W 52/36* (2009.01)
*H04W 72/23* (2023.01)

(52) U.S. Cl.
CPC ....... *H04W 52/242* (2013.01); *H04W 52/365* (2013.01); *H04W 72/23* (2023.01)

(58) Field of Classification Search
CPC ... H04W 52/08; H04W 52/10; H04W 52/242; H04W 52/265; H04W 52/365; H04W 72/14

(Continued)

(56) References Cited

U.S. PATENT DOCUMENTS

| | | | | |
|---|---|---|---|---|
| 2013/0107751 A1* | 5/2013 | Kiyoshima | ......... | H04W 52/146 370/252 |
| 2015/0215874 A1* | 7/2015 | Chen | ................... | H04W 52/346 455/522 |

(Continued)

FOREIGN PATENT DOCUMENTS

| | | |
|---|---|---|
| CN | 102595613 A | 7/2012 |
| CN | 102917436 A | 2/2013 |

(Continued)

OTHER PUBLICATIONS

International Search Report and Written Opinion for PCT Appl. No. PCT/CN2019/099751 dated Oct. 29, 2019 (with English translation, 9 pages).

(Continued)

*Primary Examiner* — John J Lee
(74) *Attorney, Agent, or Firm* — Foley & Lardner LLP

(57) ABSTRACT

Disclosed are power control method and device, and method and device for determining target receiving power. The power control method includes: space domain resource information of a transmission is received; a power control parameter of the transmission is determined according to the space domain resource information of the transmission and an association between space domain resource information and power control parameter, where a number of at least one parameter of the power control parameter of the transmission is greater than 1; and a transmit power of the transmission is determined according to the power control parameter of the transmission. According to the embodiments of the present disclosure, the power control parameter is configured for one transmission, a number of at least one parameter of the configured power control parameter is greater than 1, and a beam scenario or a panel scenario or a multi-TRP scenario is supported.

18 Claims, 8 Drawing Sheets

(58) Field of Classification Search
USPC .................. 455/522, 69, 452.1, 67.11, 509
See application file for complete search history.

(56) References Cited

U.S. PATENT DOCUMENTS

| | | | | |
|---|---|---|---|---|
| 2018/0279274 | A1* | 9/2018 | Sun | H04W 72/04 |
| 2019/0261280 | A1* | 8/2019 | Jung | H04W 52/386 |
| 2020/0112926 | A1* | 4/2020 | Laghate | H04B 7/0404 |
| 2020/0178259 | A1* | 6/2020 | Pan | H04W 52/325 |

FOREIGN PATENT DOCUMENTS

| | | |
|---|---|---|
| CN | 103379603 A | 10/2013 |
| CN | 103797865 A | 5/2014 |
| CN | 104160733 A | 11/2014 |
| CN | 104518845 A | 4/2015 |
| CN | 107251619 A | 10/2017 |
| JP | 2018-074576 A | 5/2018 |
| KR | 20130008603 A | 1/2013 |
| WO | WO-2017/117424 A1 | 7/2017 |

OTHER PUBLICATIONS

3rd Generation Partnership Project: "Physical layer procedures for control (Release 15)" Technical Specification Group Radio Access Network; NR; 3GPP TS 38.213 V15.2.0; Jun. 2018; Valbonne, France (99 pages).

Extended European Search Report for EP Appl. No. 19847178.1, dated Sep. 13, 2021 (11 pages).
Samsung: "Summary of NR UL power control—CA aspects" 3GPP TSG RAN WG1 Meeting #92; R1-1803239; Mar. 2, 2018; Athens, Greece (10 pages).
Vivo: "Remaining issues on CA UL power control" 3GPP TSG RAN WG1 Meeting #92bis; R1-1803843; Apr. 20, 2018; Sanya, China (1 page).
First Office Action for JP Appl. No. 2021-506722, dated Jul. 5, 2022 (with English translation, 6 pages).
Second Office Action on JP Appl. No. 2021-506722, dated Feb. 7, 2023 (with English translation, 5 pages).
Zte et al., "Summary for AI 7.1.6.1 NR UL power control in non-CA aspects", 3GPP TSG RAN WG1 Meeting #92, R1-1803282, Feb. 27, 2018, Athens, Greece (29 pages).
MCC Support, "Final Report of 3GPP TSG RAN WG1 #92bis v1.0.0", 3GPP TSG RAN WG1 Meeting #93, R1-1805801, May 25, 2018, Busan, South Korea (195 pages).
Notice of Allowance for KR Appl. No. 10-2020-7036975, dated Sep. 1, 2022, (with English translation, 15 pages).
Samsung, "Summary of NR UL power control—CA aspects", 3GPP TSG RAN WG1 Meeting #92bis, R1-1805571, Apr. 20, 2018, Sanya, China (10 pages).
Search Report on CN Appl. No. 202110758642.8, dated Jan. 21, 2022.
Vivo, "Remaining issues and text proposals on NR UL power control", 3GPP TSG RAN Wg1 Meeting AH 1801, R1-1800209, Jan. 26, 2018, Vancouver, Canada (5 pages).

* cited by examiner

POWER CONTROL METHOD AND DEVICE, AND METHOD AND DEVICE FOR DETERMINING TARGET RECEIVING POWER

CROSS-REFERENCE TO RELATED APPLICATIONS

This application claims the benefit of priority under 35 U.S.C. § 120 as a continuation of PCT Patent Application No. PCT/CN2019/099751, filed on Aug. 8, 2019, which claims priority to Chinese patent application No. 201810910283.1 filed with CNIPA on Aug. 10, 2018, and Chinese patent application No. 201811076580.7 filed with CNIPA on Sep. 14, 2018, the disclosures of both of which are incorporated herein by reference in their entireties.

TECHNICAL FIELD

The embodiments of the present disclosure relate to, but are not limited to, the field of wireless communications, and in particular to a power control method and device, and a method and device for determining target receiving power.

BACKGROUND

At present, new radio (NR) technology is being formulated. As a fifth generation mobile communication system, this technology needs to support an enormous number of different types of application scenarios and also needs to support traditional frequency bands, new high frequency bands, and beam modes at the same time, which brings great challenges to the design of power control.

The power control of an uplink transmission is related to many factors, such as path loss (PL), target receiving power, maximum transmit power, closed-loop power adjustment amount, bandwidth of transmission, rate of transmission. In the NR, the uplink transmission at least includes a physical uplink shared channel (PUSCH), a physical uplink control channel (PUCCH) and a sounding reference signal (SRS).

In the related art, a number of any one parameter of a power control parameter used for power control of one transmission is 1, with the development of the technology, a multi-beam scenario or a multi-panel scenario or a multi-transmission receiver node (TRP) scenario needs to be supported, it would become necessary that a number of parameters of the power control parameter used for the power control of one transmission is multiple, however, no effective schemes have been given in the related art.

SUMMARY

The embodiments of the present disclosure provide a power control method and device, and a method and device for determining target receiving power, which may configure a power control parameter for one transmission, and a number of at least one parameter of the configured power control parameter is greater than 1.

An embodiment of the present disclosure provides a power control method. The power control method includes: space domain resource information of a transmission is received; a power control parameter of the transmission is determined according to the space domain resource information of the transmission and an association between space domain resource information and a power control parameter, where a number of at least one parameter of the power control parameter of the transmission is greater than 1; and a transmit power of the transmission is determined according to the power control parameter of the transmission.

In an embodiment of the present disclosure, the power control parameter includes at least one of: an open-loop power control parameter, a closed-loop power control parameter, or a path loss measurement parameter.

In an embodiment of the present disclosure, the open-loop power control parameter includes at least one of: target receiving power or a path loss factor; the path loss measurement parameter includes at least one of: a reference signal resource type indicator for a path loss measurement, or a reference signal resource indicator for the path loss measurement; and the closed-loop power control parameter includes at least one of: a closed-loop power control process identifier, or a number of closed-loop power control processes.

In an embodiment of the present disclosure, the transmit power of the transmission includes a transmit power of at least one sub-transmission.

In an embodiment of the present disclosure, the step in which the power control parameter of the transmission is determined according to at least one space domain resource information of the transmission and the association between space domain resource information and power control parameter includes any one of: a power control parameter associated with the space domain resource information of the transmission in the association is taken as the power control parameter of the transmission; a power control parameter associated with all first specific space domain resource information in the association is taken as the power control parameter of the transmission, where each of the all first specific space domain resource information indicates one of reference signal resources indicated by the space domain resource information of the transmission; or a power control parameter of each reference signal resource group indicated by the space domain resource information of the transmission is determined according to the association, and a power control parameter of all reference signal resource groups indicated by the space domain resource information of the transmission is taken as the power control parameter of the transmission.

In an embodiment of the present disclosure, the step in which the power control parameter of the each reference signal resource group indicated by the space domain resource information of the transmission is determined according to the association includes any one of: the power control parameter of the reference signal resource group of the transmission is determined according to a power control parameter associated with all second specific space domain resource information in the association, where each of the all second specific space domain resource information indicates one reference signal resource in the reference signal resource group; or a power control parameter associated with third specific space domain resource information in the association is taken as the power control parameter of the reference signal resource group, where the third specific space domain resource information indicates all reference signal resources in the reference signal resource group.

In an embodiment of the present disclosure, the reference signal resources indicated by the space domain resource information are grouped according to any one of following methods: being grouped according to members of a predefined grouping; being grouped according to members of a grouping determined according to a predetermined rule based on a number of a predefined or configured grouping; or being grouped according to members of a configured grouping.

In an embodiment of the present disclosure, there is an association between the reference signal resource group and the transmit power of the sub-transmission.

In an embodiment of the present disclosure, the step in which the power control parameter of the transmission is determined according to the association and the space domain resource information of the transmission includes: the power control parameter of the transmission is determined according to a specific type of the transmission, the association, and the space domain resource information of the transmission, where the specific type includes a service type or a scheduling type.

In an embodiment of the present disclosure, the step in which the transmit power of the transmission is determined according to the power control parameter of the transmission includes: an initial transmit power of the transmission is determined according to the power control parameter of the transmission; and a final transmit power of the transmission is determined according to the initial transmit power of the transmission and a predefined transmit power offset of a specific type of the transmission relative to a basic specific type of the transmission, where the specific type includes a service type or a scheduling type.

In an embodiment of the present disclosure, the space domain resource information includes at least one of: reference signal resource information or spatial relationship information.

An embodiment of the present disclosure provides a power control method. The power control method includes: an association between space domain resource information and power control parameter is configured; and space domain resource information of a transmission is configured or indicated.

In an embodiment of the present disclosure, the step in which the space domain resource information of the transmission is configured or indicated includes: the space domain resource information of the transmission is configured or indicated through at least one of: high-layer signaling, downlink control information, media access control signaling or physical layer control signaling.

In an embodiment of the present disclosure, all reference signal resources indicated by the space domain resource information share the power control parameter; or each reference signal resource indicated by the space domain resource information corresponds to one parameter of the power control parameter; or reference signal resources indicated by the space domain resource information are divided into a number N of groups, and each group corresponds to one parameter of the power control parameter; where N is an integer larger than 1 and less than M, and M is a number of the reference signal resources indicated by the space domain resource information.

In an embodiment of the present disclosure, when a number of parameters of the power control parameter associated with the space domain resource information is 1, all reference signal resources indicated by the space domain resource information share the power control parameter; when a number of parameters of the power control parameter associated with the space domain resource information is M, each reference signal resource indicated by the space domain resource information corresponds to one of the M parameters; and when a number of parameters of the power control parameter associated with the space domain resource information is N, reference signal resources indicated by the space domain resource information are divided into a number N of groups, and each group corresponds to one of the N parameters; where N is an integer larger than 1 and less than M, and M is a number of the reference signal resources indicated by the space domain resource information.

In an embodiment of the present disclosure, all specific types supported by the transmission share the power control parameter; each specific type supported by the transmission corresponds to one parameter of the power control parameter; all specific types supported by the transmission are divided into a number Y of groups, and each group corresponds to one parameter of the power control parameter; where X is a number of the specific types supported by the transmission, and Y is an integer greater than 1 and less than X.

In an embodiment of the present disclosure, when a number of parameters of the power control parameter associated with the space domain resource information is 1, all specific types supported by the transmission share the power control parameter; when a number of parameters of the power control parameter associated with the space domain resource information is X, each specific type supported by the transmission corresponds to one of the X parameters; and when a number of parameters of the power control parameter associated with the space domain resource information is Y, Y being an integer larger than 1 and less than X, all specific types supported by the transmission are divided into Y groups, and each group corresponds to one of the Y parameters; where X is a number of the specific types supported by the transmission, and Y is an integer greater than 1 and less than X.

An embodiment of the present disclosure provides a power control method. The power control method includes: space domain resource information of a transmission is received; a power control parameter associated with the space domain resource information of the transmission is determined in an association between space domain resource information and power control parameter, where a number of at least one parameter of the determined power control parameter is greater than 1; and a power control parameter corresponding to a specific type of the transmission is determined according to the determined power control parameter, where the specific type includes a service type or a scheduling type.

In an embodiment of the present disclosure, the step in which the power control parameter corresponding to the specific type of transmission is determined according to the determined power control parameter includes any one of: the power control parameter corresponding to the specific type of the transmission is selected from the determined power control parameter; or the power control parameter corresponding to the specific type of the transmission is determined according to the determined power control parameter and a predefined power control parameter offset of the specific type of the transmission relative to a basic specific type of the transmission.

In an embodiment of the present disclosure, all specific types supported by the transmission share the power control parameter; each specific type supported by the transmission corresponds to one parameter of the power control parameter; all specific types supported by the transmission are divided into a number Y of groups, and each group corresponds to one parameter of the power control parameter; where X is a number of the specific types supported by the transmission, and Y is an integer greater than 1 and less than X.

In an embodiment of the present disclosure, when a number of parameters of the power control parameter associated with the space domain resource information is 1, all specific types supported by the transmission share the power control parameter; when a number of parameters of the power control parameter associated with the space domain resource information is X, each specific type supported by the transmission corresponds to one of the X parameters; and when a number of parameters of the power control parameter associated with the space domain resource information is Y, Y being an integer larger than 1 and less than X, all specific types supported by the transmission are divided into Y groups, and each group corresponds to one of the Y parameters; where X is a number of the specific types supported by the transmission, and Y is an integer greater than 1 and less than X.

An embodiment of the present disclosure provides a power control method. The power control method includes: space domain resource information of a transmission is received; a power control parameter of the transmission is determined according to the space domain resource information of the transmission and an association between space domain resource information and power control parameter; and an initial transmit power of the transmission is determined according to the power control parameter of the transmission; and a final transmit power of the transmission is determined according to the initial transmit power and a predefined transmit power offset of a specific type of the transmission relative to a basic specific type of the transmission, where the specific type includes a service type or a scheduling type.

An embodiment of the present disclosure provides a power control device. The power control device includes a first receiving module, a first determination module and a second determination module. The first receiving module is configured to receive space domain resource information of a transmission. The first determination module is configured to determine a power control parameter of the transmission according to the space domain resource information of the transmission and an association between space domain resource information and power control parameter, where a number of at least one parameter of the power control parameter of the transmission is greater than 1. The second determination module is configured to determine a transmit power of the transmission according to the power control parameter of the transmission.

An embodiment of the present disclosure provides a power control device. The power control device includes a first configuration module and a second configuration module. The first configuration module is configured to configure an association between space domain resource information and power control parameter. The second configuration module is configured to configure or indicate space domain resource information of a transmission.

An embodiment of the present disclosure provides a power control device. The power control device includes a second receiving module, a first searching module and a third determination module. The second receiving module is configured to receive space domain resource information of a transmission. The first searching module is configured to determine a power control parameter associated with the space domain resource information of the transmission in an association between space domain resource information and power control parameter, where a number of at least one parameter of the determined power control parameter is greater than 1. The third determination module is configured to determine a power control parameter corresponding to a specific type of the transmission according to the determined power control parameter, where the specific type includes a service type or a scheduling type.

An embodiment of the present disclosure provides a power control device. The power control device includes a third receiving module, a fourth determination module and a fifth determination module. The third receiving module is configured to receive space domain resource information of a transmission. The fourth determination module is configured to determine a power control parameter of the transmission according to the space domain resource information of the transmission and an association between space domain resource information and power control parameter. The fifth determination module is configured to determine an initial transmit power of the transmission according to the power control parameter of the transmission; determine a final transmit power of the transmission according to the initial transmit power and a predefined transmit power offset of a specific type of the transmission relative to a basic specific type of the transmission, where the specific type includes a service type or a scheduling type.

An embodiment of the present disclosure provides a power control device. The power control device includes a processor and a computer readable storage medium. The computer readable storage medium has instructions stored therein. The instructions, when executed by the processor, implement any one of the power control methods described above.

An embodiment of the present disclosure provides a computer readable storage medium. The computer readable storage medium stores a computer program. The computer program, when executed by a processor, implements steps of any one of the power control methods described above.

An embodiment of the present disclosure provides a method for determining target receiving power. The method includes a first target receiving power is determined by adopting any one of following manners, where the first target receiving power is a cell specific target receiving power for calculating a virtual power headroom: a second target receiving power is taken as the first target receiving power; a third target receiving power is taken as the first target receiving power; when a UE specific target receiving power of a virtual power headroom report is configured for a dynamic grant based service, the third target receiving power is taken as the first target receiving power; otherwise, the second target receiving power is taken as the first target receiving power; or when the UE specific target receiving power of the virtual power headroom report is configured for a non-dynamic grant service, the second target receiving power is taken as the first target receiving power; otherwise, the third target receiving power is taken as the first target receiving power; where the second target receiving power is a cell specific target receiving power configured for a non-dynamic grant transmission, and the third target receiving power is a cell specific target receiving power configured for a dynamic grant based transmission.

An embodiment of the present disclosure provides a device for determining target receiving power. The device includes a sixth determination module. The sixth determination module is configured to determine a first target receiving power by adopting any one of following manners, where the first target receiving power is a cell specific target receiving power for calculating a virtual power headroom: a second target receiving power is taken as the first target receiving power; a third target receiving power is taken as the first target receiving power; when a UE specific target receiving power of a virtual power headroom report is configured for a dynamic grant based service, the third target receiving power is taken as the first target receiving power; otherwise, the second target receiving power is taken as the first target receiving power; or when the UE specific target receiving power of the virtual power headroom report is configured for a non-dynamic grant service, the second target receiving power is taken as the first target receiving power; otherwise, the third target receiving power is taken as the first target receiving power; where the second target receiving power is a cell specific target receiving power configured for a non-dynamic grant transmission, and the third target receiving power is a cell specific target receiving power configured for a dynamic grant based transmission.

An embodiment of the present disclosure provides a device for determining target receiving power. The device includes a processor and a computer readable storage medium. The computer readable storage medium has instructions stored therein. The instructions, when executed by the processor, implement any one of the methods for determining the target receiving power described above.

An embodiment of the present disclosure provides a computer readable storage medium. The computer readable storage medium stores a computer program. The computer program, when executed by a processor, implements steps of any one of the methods for determining the target receiving power described above.

An embodiment of the present disclosure provides a method for determining target receiving power. The method includes: a first target receiving power is determined according to at least one of: a second target receiving power, a third target receiving power, or a fourth target receiving power. The first target receiving power is a cell specific target receiving power for calculating a virtual power headroom. The second target receiving power is a cell specific target receiving power configured for a non-dynamic grant transmission. The third target receiving power is a cell specific target receiving power configured for a dynamic grant based transmission. The fourth target receiving power is a cell specific target receiving power of a physical uplink shared channel transmission of a message three.

In the embodiments of the present disclosure, the step in which the first target receiving power is determined according to the second target receiving power includes: the second target receiving power is taken as the first target receiving power; or, the step in which the first target receiving power is determined according to the third target receiving power includes: the third target receiving power is taken as the first target receiving power; or, the step in which the first target receiving power is determined according to the fourth target receiving power includes: the fourth target receiving power is taken as the first target receiving power.

In the embodiments of the present disclosure, the step in which the first target receiving power is determined includes at least one of: when the second target receiving power is provided, the second target receiving power is taken as the first target receiving power; when the second target receiving power is not provided, the third target receiving power is taken as the first target receiving power; when the second target receiving power is not provided, the fourth target receiving power is taken as the first target receiving power; when the third target receiving power is provided, the third target receiving power is taken as the first target receiving power; when the third target receiving power is not provided, the second target receiving power is taken as the first target receiving power; or when the third target receiving power is not provided, the fourth target receiving power is taken as the first target receiving power.

In the embodiments of the present disclosure, the step in which the first target receiving power is determined includes at least one of: when a parameter of the non-dynamic grant transmission is provided, the second target receiving power is taken as the first target receiving power; when the parameter of the non-dynamic grant transmission is not provided, the third target receiving power is taken as the first target receiving power; when the parameter of the non-dynamic grant transmission is not provided, the fourth target receiving power is taken as the first target receiving power; when a parameter of the dynamic grant based transmission is provided, the third target receiving power is taken as the first target receiving power; or when the parameter of the dynamic grant based transmission is not provided, the fourth target receiving power is taken as the first target receiving power.

In the embodiments of the present disclosure, the step in which the first target receiving power is determined includes at least one of: when a UE specific target receiving power for calculating the virtual power headroom is configured for the dynamic grant based transmission, the third target receiving power is taken as the first target receiving power; when the UE specific target receiving power for calculating the virtual power headroom is not configured for the dynamic grant based transmission, the second target receiving power is taken as the first target receiving power; when the UE specific target receiving power for calculating the virtual power headroom is not configured for the dynamic grant based transmission, the fourth target receiving power is taken as the first target receiving power; when the UE specific target receiving power for calculating the virtual power headroom is configured for the non-dynamic grant transmission, the second target receiving power is taken as the first target receiving power; when the UE specific target receiving power for calculating the virtual power headroom is not configured for the non-dynamic grant transmission, the third target receiving power is taken as the first target receiving power; or when the UE specific target receiving power for calculating the virtual power headroom is not configured for the non-dynamic grant transmission, the fourth target receiving power is taken as the first target receiving power.

An embodiment of the present disclosure provides a device for determining target receiving power. The device includes a seventh determination module. The seventh determination module is configured to determine a first target receiving power according to at least one of a second target receiving power, a third target receiving power, or a fourth target receiving power. The first target receiving power is a cell specific target receiving power for calculating a virtual power headroom. The second target receiving power is a cell specific target receiving power configured for a non-dynamic grant transmission. The third target receiving power is a cell specific target receiving power configured for a dynamic grant based transmission. The fourth target receiving power is a cell specific target receiving power of a physical uplink shared channel transmission of a message three.

An embodiment of the present disclosure provides a device for determining target receiving power. The device includes a processor and a computer readable storage medium. The computer readable storage medium has instructions stored therein. The instructions, when executed by the processor, implement any one of the methods for determining the target receiving power described above.

An embodiment of the present disclosure provides a computer readable storage medium. The computer readable storage medium stores a computer program. The computer program, when executed by a processor, implements steps of any one of the methods for determining the target receiving power described above.

The embodiments of the present disclosure include: the space domain resource information corresponding to the transmission is determined; the power control parameter of the transmission is determined according to the space domain resource information of the transmission and the association between space domain resource information and power control parameter; where a number of at least one parameter of the power control parameter of the transmission is greater than 1; and the transmit power of the transmission is determined according to the power control parameter of the transmission. According to the embodiments of the present disclosure, the power control parameter is configured for one transmission, a number of at least one parameter of the configured power control parameter is greater than 1, to support a beam scenario or a panel scenario or a multi-TRP scenario.

BRIEF DESCRIPTION OF DRAWINGS

The accompanying drawings are intended to provide a further understanding of technical schemes of the embodiments of the present disclosure and constitute a part of the Description, the accompanying drawings together with the embodiments of the present disclosure are intended to explain the technical schemes of the embodiments of the present disclosure and do not constitute a limitation on the technical schemes of the embodiments of the present disclosure.

DETAILED DESCRIPTION

Figure 1:
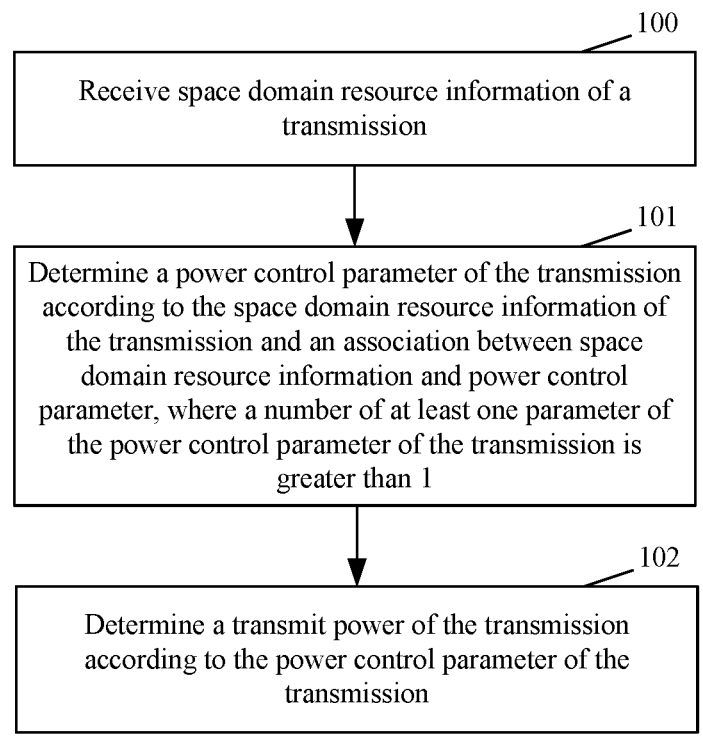
FIG. 1 is a flowchart of a power control method proposed by an embodiment of the present disclosure.

Hereinafter, embodiments of the present disclosure will be described in detail in connection with the accompanying drawings. It should be noted that the embodiments of the present disclosure and the features of the embodiments may be combined with each other arbitrarily in a case where there is no conflict.

Steps shown in the flowcharts of the accompanying drawings may be performed in a computer system such as a set of computer-executable instructions. Moreover, while a logical sequence is shown in the flowcharts, however, in some instances, the steps shown or described may be performed in an order different from that herein.

In a wireless communication system, in order to reduce power consumption of a sending apparatus and reduce the interference of unnecessary high-power sending on other transmissions, a transmit power of the transmission needs to be controlled. Factors such as a size of a communication range, maximum transmit power and receiving sensitivity of a transmitting and receiving apparatus of two communication parties, a modulation and coding mode and rate of data, a working frequency band, a bandwidth occupied by the transmission all affect the transmit power. Generally, a relatively low transmit power is required to be used as much as possible under a condition that the quality requirement of a received signal of a receiving end is satisfied.

In a general communication technology, a power control includes an open-loop power control and a closed-loop power control.

The open-loop power control refers to a power control based on a PL, that is, a first communication node sends a reference signal, and a second communication node measures a PL from the first communication node to the second communication node according to this reference signal; the PL is a difference between a transmit power of the reference signal sent by the first communication node and a receiving power of a reference signal received by the second communication node. Assuming that a PL of a transmission of the second communication node to the first communication node is the same as a PL of a transmission of the first communication node to the second communication node, the second communication node may calculate, using the PL as described above, a transmit power of a transmission to the first communication node when the second communication node acts as a sending node. Since the PL is a unilateral measurement result, the PL belongs to an open-loop part in a transmit power control.

The closed-loop power control refers to that the first communication node performs an analysis after receiving the transmission, and provides power adjustment information for the second communication node according to the received quality.

The closed-loop power control refers to the first communication node parses after receiving the transmission, and provides power adjustment information for the second communication node according to the received quality.

For Long Term Evolution (LTE), a link from a base station to a terminal is a downlink, and a link from the terminal to the base station is an uplink. A transmit power of the downlink is determined by the base station according to a channel measurement result of one or more scheduling user equipment (UE) and a scheduling algorithm, and a transmit power of the uplink is determined by combining the open-loop power control and the closed-loop power control. Moreover, the transmit power is also related to a particular amount related to the transmission, such as a sending rate, a modulation and coding scheme (MCS) level, a sending bandwidth.

The following is a calculation formula of a transmit power of a physical uplink shared channel (PUSCH) of the LTE, and parameters influencing the transmit power are explained by taking the calculation formula as an example.

$$P_{PUSCH,c}(i) = \min\left\{ \begin{array}{c} P_{CMAX,c}(i) \\ 10\log_{10}(M_{PUSCH,c}(i)) + P_{O\_PUSCH,c}(m) + \alpha_c(m) \cdot PL_c + \Delta_{TF,c}(i) + f_c(i) \end{array} \right\}$$

where, i is a sub-frame number, m is used for distinguishing PUSCH transmission of different scheduling types or different uses, such as a message 3 (Msg3) transmitted on a PUSCH channel in a random access process, a dynamically scheduled PUSCH transmission, a semi-persistently authorized PUSCH transmission, $P_{PUSCH,c}(i)$ is a transmit power of an i-th sub-frame, $P_{CMAX,c}(i)$ is a maximum transmit power of the i-th sub-frame of the UE, $M_{PUSCH,c}(i)$ is a bandwidth occupied by a PUSCH transmission of the i-th sub-frame in a frequency domain (taking a resource block (RB) as a unit), $P_{O\_PUSCH,c}(m)$ is target receiving power of a m-th transmission, $\alpha_c(m)$ is a path loss factor of the m-th transmission, $PL_c$ is a path loss, $\Delta_{TF,c}(i)$ is a power offset related to the MCS, and $f_c(i)$ is local closed-loop power control adjustment amount of the UE.

In the above-described formula, the subscript c refers to a serving cell. In a Carrier Aggregation (CA) scenario, each UE supports at least one component carrier (CC), and each CC is also referred to as one serving cell. It can be seen from the above-described formula that each parameter in a power calculation formula is configured or calculated for the serving cell.

An open-loop part of a transmit power $P_{PUSCH,c}(i)$ of an uplink transmission PUSCH includes $P_{O\_PUSCH,c}(j)$, $PL_c$ and $\alpha_c(j)$. The $P_{O\_PUSCH,c}(j)$ is divided into a cell specific parameter and an UE-specific parameter, and the cell specific parameter and the UE-specific parameter are determined by the base station and configured to the UE. A cell specific target receiving power $P_{O\_nominal}$ distinguishes a PUSCH (Semi-Static, Dynamic, Msg3) and a physical uplink control channel (PUCCH), the PUSCH and the physical uplink control channel correspond to different block error rate (BLER) requirements, respectively. UE-specific target receiving power $P_{O\_UE\_specific}$ is also set by distinguishing the above items, in order to compensate for systematic offset, such as a PL estimation error and an absolute output power setting error.

A closed-loop part of $P_{PUSCH,c}(i)$ includes a closed-loop power control adjustment amount, the closed-loop power control adjustment amount is determined by the base station according to a difference between a signal receiving quality and an expected receiving quality, and the UE is notified in a transmit power control command (TPC Command), i.e., downlink control information (DCI) in a manner of aiming at the $\delta_{PUSCH}$ of the PUSCH. The UE maintains a local closed-loop power control adjustment amount $f_c(i)$, the closed-loop power control adjustment amount is updated according to the TPC, and the purpose of the closed-loop power control is achieved by adopting the above-described formula.

There are two manners for updating the local closed-loop power control adjustment amount $f_c(i)$ according to the TPC, that is, a cumulative manner and an absolute value manner. The cumulative manner refers to a fact that the local closed-loop power control adjustment amount of the UE is jointly determined according to the TPC sent by the base station and a historical value of the local closed-loop power control adjustment amount $f_c(i)$ of the UE, and the absolute value manner refers to a fact that the local closed-loop power control adjustment amount of the UE is directly updated according to the TPC sent by the base station.

The local closed-loop power control adjustment amount $f_c(i)$ of the UE is also referred to as a power control adjustment state.

In 5G technology, the power control of the uplink transmission is at the bandwidth part (BWP) level, namely, a transmit power is respectively determined for an uplink transmission of each BWP level.

The 5G technology introduces a beam transmission manner, and both the base station and the UE support multiple beams. When working in a beam mode, the characteristics of the beam needs to be considered by the power calculation. Resources for a path loss measurement in the 5G are related to beams of a transmission path and need to be configured by the base station, so that a path loss measurement parameter exist independently of an open-loop power parameter and a closed-loop power parameter.

In order to support a beam manner, a power control parameter is configured in three parts: an open-loop power control parameter, a closed-loop power control parameter and a path loss measurement parameter. The path loss measurement parameter is also referred to as a reference signal (RS) parameter of a path loss measurement. Each part of the power control parameter supports multiple configurations, i.e., at most a number J of open-loop power control parameters may be configured, and a numbering of each open-loop power control parameter is j; at most a number K of path loss measurement parameters may be configured, and a numbering of each path loss measurement parameter is k; at most L closed-loop power control parameter may be configured, and a numbering of each closed-loop power control parameter is l; where j is an integer larger than 0 and less than or equal to J, k is an integer larger than 0 and less than or equal to K, l is an integer larger than 0 and less than or equal to L, and J, K and L are all integers larger than 0.

The open-loop power control parameter includes at least one of: target receiving power or a path loss factor.

The path loss measurement parameter includes at least one of: a reference signal resource type indicator for a path loss measurement, a reference signal resource indicator for the path loss measurement, or a processing rule of path loss values of two or more reference signals for the path loss measurement.

The closed-loop power control parameter includes at least one of: a closed-loop power control process identifier set, or a number of closed-loop power control processes.

If the UE supports multiple beams (or beam groups), the base station configures an association between each possible beam (or group of beams) and the open-loop power control parameter, the closed-loop power control parameter, the path loss measurement parameter. The beams (or beam groups) may be indicated by a reference signal resource.

The reference signal includes at least one of: a sounding reference signal (SRS), a channel state information reference signal (CSI-RS), a secondary synchronization signal block (SSB), a phase tracking reference signal (PTRS), a tracking reference signal (TRS), or a demodulation reference signal (DMRS).

The base station indicates a reference signal resource for an uplink transmission of the UE, so that the UE obtains a power control parameter associated with this reference signal resource.

Examples are given as follows.

The base station configures a number J1 of open-loop power control parameter, a number K1 of path loss measurement parameters and a number L1 of closed-loop power control parameter for a PUSCH transmission of the UE.

A transmission manner that the base station configures the PUSCH for the UE is such as a codebook based transmission or a non-codebook based transmission.

The base station configures a sounding reference signal resource set (SRS resource set) of PUSCH-based transmission manner for the UE, where the sounding reference signal resource set includes at least one sounding reference signal resource (SRS resource).

The base station sends the downlink control information (DCI) to the UE, the DCI includes an SRS resource indicator (SRI), and the SRI may be used for determining a pre-coding of the PUSCH transmission. A SRI set indicated in the DCI for different PUSCH transmission manners may be different. For example, the SRI set of the codebook based transmission may have 2 SRIs, each SRI represents one SRS resource; the SRI set of the non-codebook based transmission may have 15 SRIs, each SRI represents one SRS resource or multiple SRS resources.

The base station configures the UE with the association between each member SRI in the SRI set indicated in the DCI with at least one of: an open-loop power control parameter number, a path loss measurement parameter number, or a closed-loop power control parameter number.

The base station informs the UE of a power control parameter of the PUSCH transmission through the SRI in the DCI.

The uplink transmission described herein includes at least one of: a physical random access channel (PRACH), a PUCCH, a PUSCH or a SRS.

Referring to FIG. 1, an embodiment of the present disclosure proposes a power control method. The method includes steps described below.

In step 100, space domain resource information of a transmission is received.

In the embodiments of the present disclosure, the space domain resource information includes at least one of: reference signal resource information or spatial relationship information.

The reference signal resource information indicates at least one reference signal resource, such as an SRS resource.

The reference signal resource information may be a reference signal resource indicator identifier, such as an SRI.

The spatial relationship includes at least one reference signal or at least one reference signal resource.

A transmission mode may be determined based on at least one reference signal configured in a spatial relationship of the transmission, for example, a sending beam of the transmission is the same as a sending beam of the reference signal, or the sending beam of the transmission and the sending beam of the reference signal satisfy a certain channel characteristic assumption, or satisfy a quasi-co-location relationship.

A reference signal belonging to a same spatial relationship satisfy a certain channel characteristic hypothesis, or satisfy a quasi co-location relationship.

In step 101, a power control parameter of the transmission is determined according to the space domain resource information of the transmission and an association between space domain resource information and power control parameter, where a number of at least one parameter of the power control parameter of the transmission is greater than 1.

In the embodiments of the present disclosure, the power control parameter includes at least one of: an open-loop power control parameter, a closed-loop power control parameter, or a path loss measurement parameter.

The open-loop power control parameter includes at least one of: target receiving power or a path loss factor.

The path loss measurement parameter includes at least one of: a reference signal resource type indicator for a path loss measurement, a reference signal resource indicator for the path loss measurement, or a processing rule of path loss values of two or more reference signals for the path loss measurement.

The closed-loop power control parameter includes at least one of: a closed-loop power control process identifier set, or a number of closed-loop power control processes.

In an embodiment of the present disclosure, the association between space domain resource information and power control parameter may be obtained through a configuration and indication, and specifically, the association is configured and indicated through at least one of: high-layer signaling, downlink control information, MAC signaling, or physical layer control signaling; or the association is configured and indicated through reusing existing associations.

In an embodiment of the present disclosure, all reference signal resources indicated by the space domain resource information share the power control parameter; or, each reference signal resource indicated by the space domain resource information corresponds to one parameter of the power control parameter; or, reference signal resources indicated by the space domain resource information are divided into a number N of groups, N is an integer greater than 1 and less than M, and each group corresponds to one parameter of the power control parameter; where N is an integer larger than 1 and less than M, and M is a number of the reference signal resources indicated by the space domain resource information.

In an embodiment of the present disclosure, when a number of parameters of the power control parameter associated with the space domain resource information is 1, the all reference signal resources indicated by the space domain resource information share the parameter; when a number of parameters of the power control parameter associated with the space domain resource information is M, the each reference signal resource indicated by the space domain resource information corresponds to one of the M parameters; and when a number of parameters of the power control parameter associated with the space domain resource information is N, N is an integer greater than 1 and less than M, the reference signal resources indicated by the space domain resource information are divided into a number N of groups, and each group corresponds to one of the N parameters, where N is an integer larger than 1 and less than M, and M is the number of reference signal resources indicated by the space domain resource information.

For example, the base station configures an SRS resource set for a transmission mode being the non-codebook based transmission of a UE, and the SRS resource set includes 4 SRS resources, i.e., SRS1 to SRS4. When SRI information is used in DCI to indicate the used SRS resources, there are at most 15 combinations, which are as follows:

SRI0: SRS1
SRI1: SRS2
SRI2: SRS3
SRI3: SRS4
SRI4: SRS1 SRS2
SRI5: SRS1 SRS3
SRI6: SRS1 SRS4
SRI7: SRS2 SRS3
SRI8: SRS2 SRS4
SRI9: SRS3 SRS4
SRI10: SRS1 SRS2 SRS3
SRI11: SRS1 SRS2 SRS4
SRI12: SRS1 SRS3 SRS4
SRI13: SRS2 SRS3 SRS4
SRI14: SRS1 SRS2 SRS3 SRS4

The above SRI4 is taken as an example, a power control parameter associated with the SRI4 may include 2 open-loop power control parameters, 2 closed-loop power control parameters and 2 path loss measurement parameters, then two sets of power control parameters respectively correspond to two SRS in the SRI4, i.e., the SRS1 and the SRS2, where one set of power control parameters include 1 open-loop power control parameter, 1 closed-loop power control parameter and 1 path loss measurement parameter.

The above SRI4 is taken as an example, the power control parameter associated with the SRI4 may further include 2 open-loop power control parameters, 2 closed-loop power control parameters and 1 path loss measurement parameter. If there is only 1 path loss measurement parameter, then this path loss measurement parameter is shared between the SRS1 and the SRS2; and if a number of the open-loop power control parameter and a number of the closed-loop power control parameter are both 2, then the two open-loop power control parameters respectively correspond to the SRS1, and the two closed-loop power control parameters respectively correspond to the SRS2.

The above SRI10 is taken as an example, a power control parameter associated with the SRI10 may include 1 open-loop power control parameter, 1 closed-loop power control parameter and 1 path loss measurement parameter, then the SRS1, the SRS2 and the SRS3 share these power control parameters.

The above SRI10 is taken as an example, the power control parameter associated with the SRI10 may further include 3 open-loop power control parameters, 3 closed-loop power control parameter and 3 path loss measurement parameters, then the SRS1, the SRS2 and the SRS3 respectively use one set of power control parameters therein; where the one set of power control parameters include 1 open-loop power control parameter, 1 closed-loop power control parameter and 1 path loss measurement parameter.

The above SRI10 is taken as an example, the power control parameter associated with the SRI10 may further include 3 open-loop power control parameters, 1 closed-loop power control parameter and 3 path loss measurement parameters, then the SRS1, the SRS2 and the SRS3 share the 1 closed-loop power control parameter, the SRS1, the SRS2 and the SRS3 use one of the above-described 3 open-loop power control parameters, respectively, and the SRS1, the SRS2 and the SRS 3 use one of the above-described 3 path loss measurement parameters, respectively.

The above SRI10 is taken as an example, the power control parameter associated with the SRI10 may further include 2 open-loop power control parameters, 2 closed-loop power control parameters and 2 path loss measurement parameters, then the SRS1, the SRS2 and the SRS3 are divided into two groups, and each group uses one set of the above-described two sets of power control parameters; where one set of power control parameters include 1 open-loop power control parameter, 1 closed-loop power control parameter and 1 path loss measurement parameter.

The above SRI14 is taken as an example, a power control parameter associated with the SRI14 may include 2 open-loop power control parameters, 2 closed-loop power control parameters and 1 path loss measurement parameter, then the SRS1, the SRS2, the SRS3 and the SRS4 are divided into two groups, each group uses one of the 2 open-loop power control parameters, respectively, each group uses one of the 2 closed-loop power control parameters, respectively, and all SRS share 1 path loss measurement parameter.

In an embodiment of the present disclosure, one set of power control parameters is not merely limited to what is described above, that is, including the 1 open-loop power control parameter, the 1 closed-loop power control parameter and the 1 path loss measurement parameter, and in fact, the one set of power control parameters includes at least one of: 1 open-loop power control parameter, 1 closed-loop power control parameter or 1 path loss measurement parameter.

In an embodiment of the present disclosure, all specific types supported by the transmission share the power control parameter; each specific type supported by the transmission corresponds to one parameter of the power control parameter; the all specific types supported by the transmission are divided into a number Y of groups, and each group corresponds to one parameter of the power control parameter, where X is a number of the specific types supported by the transmission, and Y is an integer greater than 1 and less than X.

In an embodiment of the present disclosure, when a number of parameters of the power control parameter associated with the space domain resource information is 1, all service types supported by the transmission share this parameter; when a number of parameters of the power control parameter associated with the space domain resource information is X, each service type supported by the transmission corresponds to one of the X parameters; and when a number of parameters of the power control parameter associated with the space domain resource information is Y, Y being an integer greater than 1 and less than X, the all service types supported by the transmission are divided into a number Y of groups, and each group corresponds to one of the Y parameters; where X is a number of the specific types supported by the transmission, and Y is an integer greater than 1 and less than X.

In an embodiment of the present disclosure, the power control parameter of the transmission may be determined by adopting any one of following methods.

According to a first method, the power control parameter of the transmission is determined directly according to the association and the space domain resource information of the transmission. In particular, there are following three methods.

According to method one, a power control parameter associated with the space domain resource information of the transmission in the association is taken as the power control parameter of the transmission.

In this method, a power control parameter transmitted on one of the reference signal resources indicated by the space domain resource information is a power control parameter of the reference signal resource or a group in which the reference signal resource is located in the power control parameter associated with the space domain resource information.

According to method two, a power control parameter associated with all first specific space domain resource information in the association are taken as the power control parameter of the first transmission; where each of the all first specific space domain resource information indicates one of the reference signal resources indicated by the space domain resource information.

In this method, a power control parameter transmitted on one of the reference signal resources indicated by the space domain resource information is a power control parameter associated with the first specific space domain resource information.

The above SRI4 is taken as an example, it indicates the SRI1 and the SRI2, where the SRI1 corresponds to the SRI0, and the SRI2 corresponds to the SRI1, then the SRI4 may determine a transmit power transmitted on the SRI1 according to the power control parameter associated with the SRI0 and determine a power control parameter transmitted on the SRS2 according to the power control parameter associated with the SRI1.

According to method three, a power control parameter of each reference signal resource group indicated by the space domain resource information of the transmission is determined according to the association, and a power control parameter of all reference signal resource groups indicated by the space domain resource information of the transmission is taken as the power control parameter corresponding to the transmission.

In the method three, there is an association between the reference signal resource group and a transmit power of a sub-transmission.

The association between the reference signal resource group and the transmit power of the sub-transmission refers to that each sub-transmission corresponds to different reference signal resource groups and is associated with a group of power control parameters.

In the method three, the power control parameter of each reference signal resource group indicated by the space domain resource information of the transmission may be determined by adopting any one of following methods.

1. A power control parameter of the reference signal resource group of the space domain resource information of the transmission is determined according to a power control parameter associated with all second specific space domain resource information in the association; where each of the all second specific space domain resource information indicates one reference signal resource in the reference signal resource group.

In this method, a power control parameter transmitted on the reference signal resource indicated by the space domain resource information is a power control parameter associated with the second specific space domain resource information of a group in which the reference signal resource is located.

In this method, a union set of the power control parameter associated with the all second specific space domain resource information may be taken as a power control parameter of the reference signal resource group of the space domain resource information of the transmission; or, a set of power control parameters are determined as the power control parameter of the reference signal resource group of the space domain resource information of the transmission according to the power control parameter associated with the all second specific space domain resource information.

2. A power control parameter associated with third specific space domain resource information in the association is taken as a power control parameter of the reference signal resource group; where the third specific space domain resource information indicates all reference signal resources in the reference signal resource group.

In this method, a power control parameter transmitted on the reference signal resource indicated by the space domain resource information is a power control parameter of a group in which this reference signal resource is located.

The above-described SRI14 is taken as an example, it indicates that the SRS1, the SRS2, the SRS3 and the SRS4 may correspond to different groups, assuming that a number of groups is 2, a group 1 includes the SRS1 and the SRS2, and a group 2 includes the SRS3 and the SRS4, then a power control parameter corresponding to the two groups is determined by adopting one of following manners.

In manner 1, a power control parameter of the group 1 is obtained according to the power control parameter of the SRI0 indicating the SRS1 and the power control parameter of the SRI1 indicating the SRS2; and a power control parameter of the group 2 is obtained according to the power control parameter of the SRI2 indicating the SRS3 and the power control parameter of the SRI3 indicating the SRS4.

In manner 2, a power control parameter of the group 1 is obtained according to the power control parameter of the SRI4 indicating the SRS1 and the SRS2; and a power control parameter of the group 2 is obtained according to the power control parameter of the SRI9 indicating the SRS3 and the SRS4.

In the method three, reference signal resources contained in the space domain resource information may be grouped by adopting any one of following methods.

1. The reference signal resources contained in the space domain resource information may be grouped according to members of a predefined group, namely, a group to which the reference signal resource indicated by the space domain resource information belongs is predefined For example, when the space domain resource information indicates 4 reference signal resources, that is, a reference signal resource 1, a reference signal resource 2, a reference signal resource 3, and a reference signal resource 4, respectively, then the reference signal resource 1 and then reference signal resource 2 are grouped into one group, and the reference signal resource 3 and the reference signal resource 4 are grouped into one group.

2. The reference signal resources contained in the space domain resource information may be grouped according to members of a group determined according to a predetermined rule based on a number of a predefined or configured group.

The predetermined rule includes: M members are divided into a number N of groups, where M and N are positive integers, and M is greater than or equal to N; when M may be exactly divided by N, each group includes M/N members, and the M members are sequentially distributed to the N groups; if M=4 and N=2, then the first two SRS resources are in the group 1, and the last two SRS resources are in the group 2; when M may not be exactly divided by N, assuming that the remainder obtained by dividing M by N is X, a number of members contained in the first X groups is M/N rounding down plus 1, and a number of members contained in the remaining groups is M/N rounding down; for example, M=5, N=2, M/N down takes an integer of 2 and the remainder is 1, then the group 1 includes the first 3 SRS resources and the group 2 includes the last 2 SRS resources.

3. The reference signal resources contained in the space domain resource information may be grouped according to the members of a configured group.

According to a second method, a power control parameter of the transmission is determined according to a specific type, the association of the transmission, and the space domain resource information of the transmission.

The specific type includes a service type or a scheduling type.

The service type of the transmission is, such as, a URLLC and an eMBB.

The scheduling type of the transmission does not explicitly indicate the service type, but indicates that such a transmission is a special scheduling, such as a transmission with a special priority or a transmission that requires power enhancement.

Specifically, it may be implemented in any one of following manners.

In manner one, an initial power control parameter of the transmission is determined according to the association and the space domain resource information of the transmission, and a final power control parameter of the transmission is determined according to the initial power control parameter and a predefined power control parameter offset of a specific type of the transmission relative to a basic specific type of the transmission.

In this method, the initial power control parameter of transmission may be determined by adopting any one of the method one to the method three described above, which will not be repeated here.

In this method, the final power control parameter of the transmission is a sum of the initial power control parameter of the transmission and the power control parameter offset.

In manner two, the initial power control parameter of the transmission is determined according to the association and the space domain resource information of the transmission, and a specific type of power control parameter of the transmission is selected from the initial power control parameter.

In this method, the initial power control parameter of the transmission may be determined by adopting any one of the method one to the method three described above, which will not be repeated here.

In this method, a number of at least one parameter of the initial power control parameter is a number of the specific type supported by the transmission, which respectively corresponds to different specific types.

In step 102, a transmit power of the transmission is determined according to the power control parameter of the transmission.

In an embodiment of the present disclosure, the transmit power of the transmission includes a transmit power of at least one sub-transmission.

For example, one PUSCH transmission is sent in two beam directions, and the PUSCH sent in each beam direction is independently determined in power, that is, the PUSCH transmission has two sub-transmissions, which respectively correspond to a transmit power of an independent sub-transmission.

For another example, one PUSCH transmission is sent by adopting two antenna ports, and the PUSCH sent by each antenna port is independently determined in power, that is, the PUSCH transmission has two sub-transmissions, which respectively correspond to a transmit power of an independent sub-transmission.

In an embodiment of the present disclosure, the transmit power of the transmission may be determined directly from the power control parameter of the transmission, that is, the transmit power of the transmission may be determined in a same manner regardless of which service type or scheduling type the transmission belongs to; or, when the service type of the transmission needs to be distinguished, firstly, the initial transmit power of the transmission may be determined according to the power control parameter of the transmission; and then the final transmit power of the transmission is determined according to the initial transmit power of the transmission and the predefined transmit power offset of the service type of the transmission relative to the basic service type of the transmission; or, when the scheduling type of the transmission needs to be distinguished, firstly, the initial transmit power of the transmission may be determined according to the power control parameter of the transmission; and then the final transmit power of the transmission is determined according to the initial transmit power and the predefined transmit power offset of the scheduling type of the transmission relative to the basic scheduling type of the transmission.

The service type may be identified by at least one of: different DCI formats, different Radio Network Temporary Identities (RNTI), different control resource sets (CORESET), different search spaces, different bits in DCI, different Cyclic Redundancy Check (CRC) maskings, different CRC scrambling codes, different configured Channel Quality Indicators (CQI)/Modulation and Coding Scheme (MCS) tables or target Block Error Ratios (BLER), different transmission durations, or different feedback delays.

For example, when different RNTIs are adopted to identify different services, one RNTI identifies a URLLC service, and the other RNTI identifies an eMBB. Or, a special RNTI is used for identifying the URLLC service.

Different service types and different scheduling types are used for distinguishing the URLLC service, and the same is true for service types having the similar requirements on low delay and high reliability.

The transmit power offset may be predefined. For example, when an enhanced Mobile Broadband (eMBB) is a basic service type and Ultra-high Reliable Ultra-Low Latency Communication (URLLC) is a non-basic service type, a transmit power offset of the URLLC service with respect to the eMBB service is predefined.

Or, the transmit power offset may be obtained by an indication (e.g., through physical layer control signaling or a high-layer signaling instruction).

A sum of the initial transmit power and the transmit power offset is taken as the final transmit power of the transmission.

When the transmit power or the initial transmit power of the transmission is determined according to the power control parameter corresponding to the transmission, if the power control parameter corresponding to the transmission is determined by adopting the method one in the step 101 (that is, the power control parameter associated with the space domain resource information of the transmission in the association is taken as the power control parameter of the transmission), the transmit power or the initial transmit power transmitted on one of the reference signal resources indicated by the space domain resource information is determined according to the reference signal resource or a parameter corresponding a group in which the reference signal resource is located in the power control parameter associated with the space domain resource information.

If the power control parameter corresponding to the transmission is determined by adopting the method two in the step 101 (i.e., the power control parameter associated with the all first specific space domain resource information in the association is taken as the power control parameter of the transmission), the transmit power or the initial transmit power transmitted on one of the reference signal resources indicated by the space domain resource information is determined according to the power control parameter associated with the first specific space domain resource information.

The above SRI4 is taken as an example, it indicates the SRS1 and the SRS2, the SRS1 corresponds to the SRI0, and the SRS2 corresponds to the SRI1, then the SRI4 may determine a transmit power transmitted on the SRS1 according to power control parameter associated with the SRI0, and determine a transmit power transmitted on the SRS2 according to the power control parameter associated with the SRI1.

If the power control parameter corresponding to the transmission is determined by adopting the method three in the step 101 (that is, the power control parameter of each reference signal resource group of the space domain resource information is determined according to the association, and the power control parameter of the all reference signal resource groups of the space domain resource information is taken as the power control parameter of the transmission), then:

If the power control parameter of each reference signal resource group of the space domain resource information is determined according to the power control parameter associated with the all second specific space domain resource information in the association, the transmit power or the initial transmit power transmitted on the reference signal resource indicated by the space domain resource information is determined according to the power control parameter associated with the second specific space domain resource information.

The above-described SRI14 is taken as an example, it indicates that the SRS1, the SRS2, the SRS3 and the SRS4 may correspond to different groups, assuming that a number of group is 2, a group 1 includes the SRS1 and the SRS2, and a group 2 includes the SRS3 and the SRS4, then a power control parameter of the group 1 is obtained according to the power control parameter of SRI0 indicating the SRS1 and the power control parameter of the SRI1 indicating the SRS2; and a power control parameter of the group 2 is obtained according to the power control parameter of the SRI2 indicating the SRS3 and the power control parameter of the SRI3 indicating the SRS4.

If the power control parameter associated with the third specific space domain resource information in the association is taken as the power control parameter of the reference signal resource group, then the transmit power transmitted on the reference signal resource indicated by the space domain resource information is determined according to the power control parameter of a group in which the reference signal resource is located.

The above-described SRI14 is taken as an example, it indicates that the SRI1, the SRS2, the SRS3 and the SRS4 may correspond to different groups, assuming that a number of group is 2, a group 1 includes the SRI1 and the SRS2, and a group 2 includes the SRS3 and the SRS4, then the power control parameter of the group 1 is obtained according to the power control parameter of the SRI4 indicating the SRI1 and the SRS2; and the power control parameter of the group 2 is obtained according to the power control parameter of the SRI9 indicating the SRS3 and the SRS4.

According to an embodiment of the present disclosure, the power control parameter is configured for one transmission, and the number of at least one parameter of the configured power control parameter is greater than 1 to support a beam scenario or a panel scenario or a multi-TRP scenario.

According to an embodiment of the present disclosure, the power control is more finer, the flexibility of carrying out the power control according to beams or beam groups is improved, and meanwhile multiple service scenarios are supported, so that the URLLC obtains higher power compared with an ordinary service so as to improve the robustness.

Figure 2:
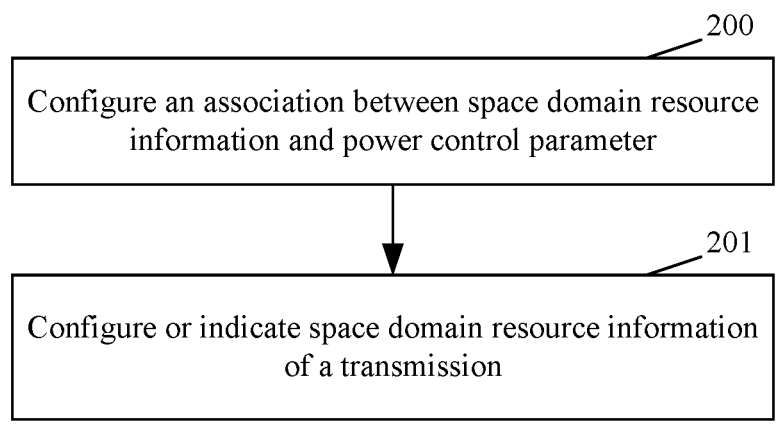
FIG. 2 is a flowchart of a power control method proposed by another embodiment of the present disclosure.

Referring to FIG. 2, another embodiment of the present disclosure proposes a power control method, the power control method includes described below.

In step 200, an association between space domain resource information and power control parameter is configured.

In an embodiment of the present disclosure, the space domain resource information, the power control parameter, and the association between the space domain resource information and the power control parameter, are the same as those of the previous embodiments, which will not be repeated here.

In step 201, space domain resource information of a transmission is configured or indicated.

In an embodiment of the present disclosure, the step in which the space domain resource information of the transmission is configured or indicated includes: the space domain resource information of the transmission is configured or indicated by at least one of: high-layer signaling, downlink control information, Media Access Control (MAC) signaling, or physical layer control signaling (i.e., physical layer signaling, the physical layer signaling is PDCCH, which includes Downlink Control Information (DCI), i.e., physical layer control signaling).

Figure 3:
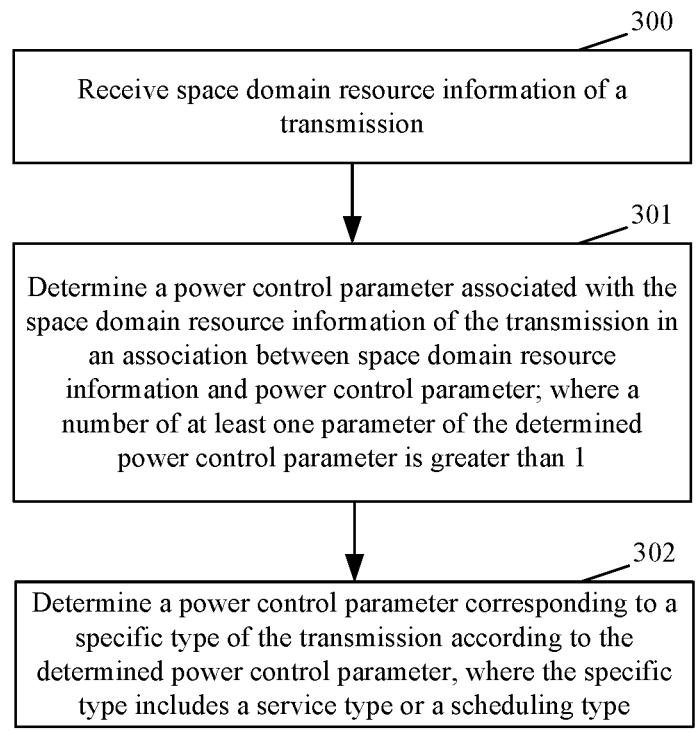
FIG. 3 is a flowchart of a power control method proposed by another embodiment of the present disclosure.

Referring to FIG. 3, another embodiment of the present disclosure proposes a power control method, the power control method includes described below.

In step 300, space domain resource information of a transmission is received.

In step 301, a power control parameter associated with the space domain resource information of the transmission is determined in an association between space domain resource information and power control parameter; where a number of at least one parameter of the determined power control parameter is greater than 1.

In an embodiment of the present disclosure, a number of the parameters of the determined power control parameter being greater than 1 means that a number of desirable values of the at least one parameter of the determined power control parameter is greater than 1.

In an embodiment of the present disclosure, when the number of the parameters of the determined power control parameter is greater than 1, different values of the parameters correspond to different specific types, and the different specific types may also share a same value of the parameters.

In an embodiment of the present disclosure, a number of any one parameter of the power control parameter associated with the space domain resource information is any one of 1 to X, where X is a number of the specific type supported by the transmission.

When a number of parameters of the power control parameter associated with the space domain resource information is 1, all specific types supported by the transmission share the parameter.

When a number of parameters of the power control parameter associated with the space domain resource information is X, each specific type supported by the transmission corresponds to one of the X parameters.

When a number of parameters of the power control parameter associated with the space domain resource information is N, and N is an integer larger than 1 and less than X, all specific types supported by the transmission are divided into N groups, each group correspond to one parameter, and the specific type in each group shares this parameter corresponding to the group.

In step 302, a power control parameter corresponding to a specific type of the transmission is determined according to the determined power control parameter, where the specific type includes a service type or a scheduling type.

In an embodiment of the present disclosure, the step in which a power control parameter corresponding to a service type of the transmission is determined according to the searched power control parameter includes any one of: a power control parameter corresponding to the service type of the transmission is selected from the searched power control parameter; or a power control parameter corresponding to the service type of the transmission is determined according to the searched power control parameter and a predefined power control parameter offset of the service type of the transmission relative to a basic service type of the transmission, that is, the power control parameter corresponding to the service type of the transmission is a sum of the searched power control parameter and the power control parameter offset.

A specific implementation process of the embodiments of the present disclosure is the same as that of the previous embodiments, which will not be repeated here.

Figure 4:
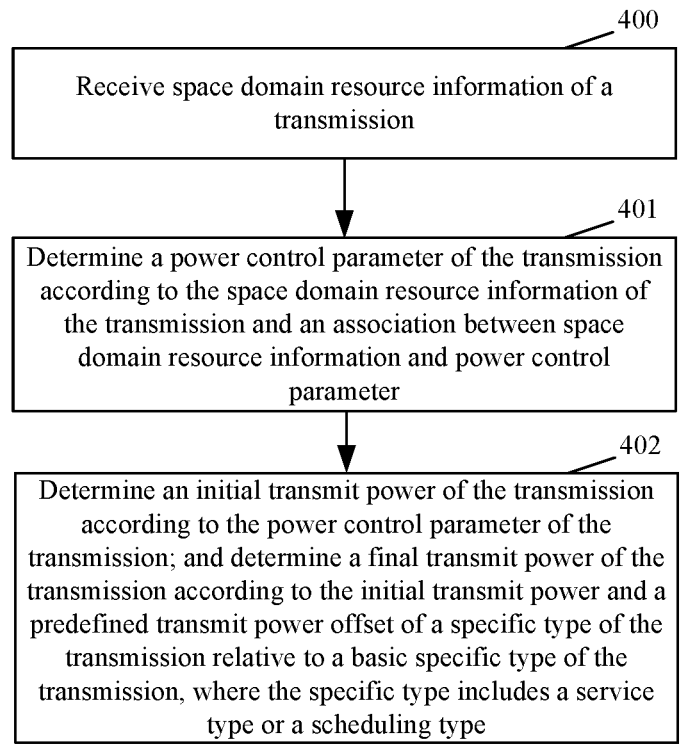
FIG. 4 is a flowchart of a power control method proposed by another embodiment of the present disclosure.

Referring to FIG. 4, another embodiment of the present disclosure proposes a power control method, the power control method includes described below.

In step 400, space domain resource information of a transmission is received.

In step 401, a power control parameter of the transmission is determined according to the space domain resource information of the transmission and an association between space domain resource information and power control parameter.

In step 402, an initial transmit power of the transmission is determined according to the power control parameter of the transmission; and a final transmit power of the transmission is determined according to the initial transmit power and a predefined transmit power offset of a specific type of the transmission relative to a basic specific type of the transmission, where the specific type includes a service type or a scheduling type.

In an embodiment of the present disclosure, the final transmit power of the transmission is a sum of the initial transmit power and the transmit power offset.

A specific implementation process of the embodiments of the present disclosure is the same as that of the previous embodiments, which will not be repeated here.

The power control method of the embodiments of the present disclosure is exemplified below by specific examples, and the examples cited are not used for limiting the scope of protection of the embodiments of the present disclosure. For example, the following is exemplified by a base station and a UE as examples, but the power control method implemented between any two communication nodes is within the protection scope of the embodiments of the present disclosure.

Figure 5:
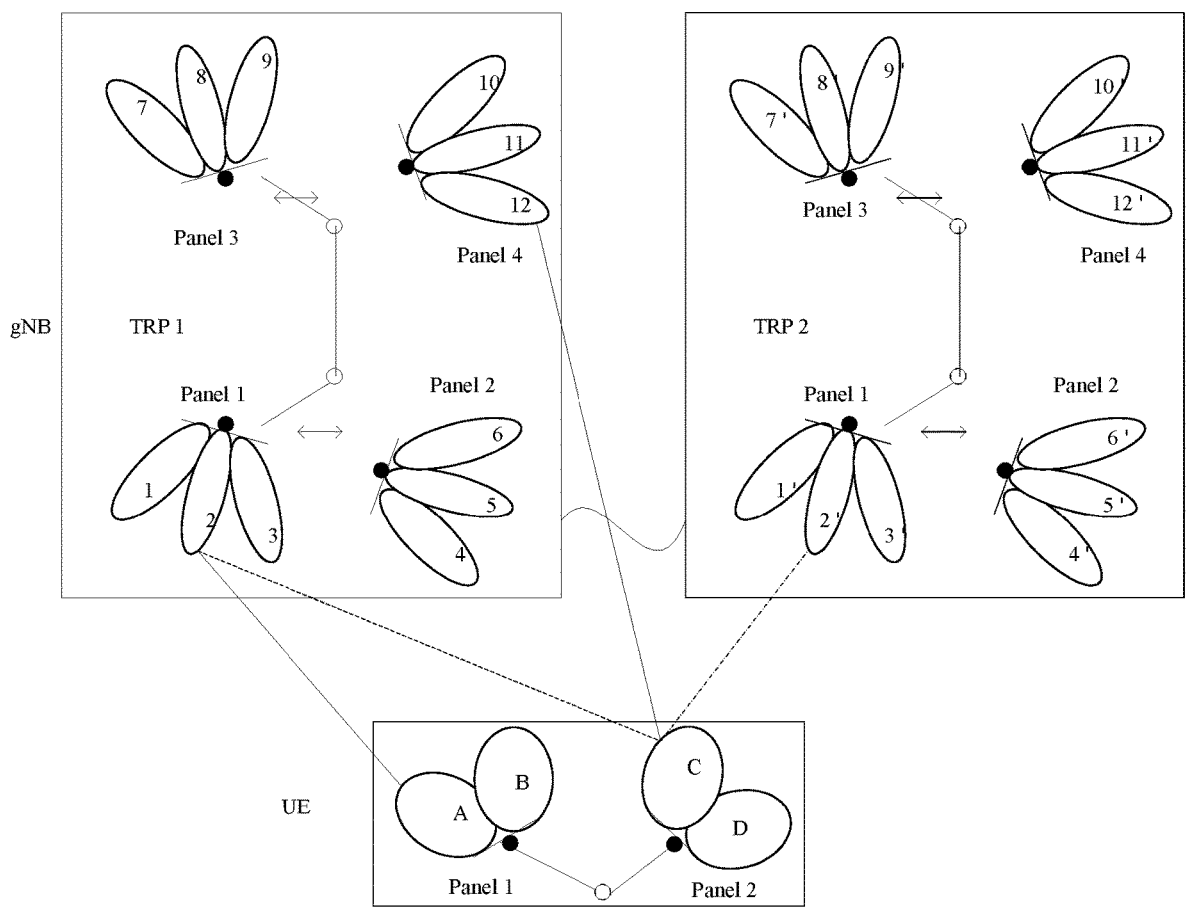
FIG. 5 is a schematic diagram of a beam relationship between a base station and a user equipment (UE) according to an embodiment of the present disclosure.

FIG. 5 is a schematic diagram of a beam relationship between a base station and a UE. As shown in FIG. 5, a gNB is the base station, and the UE is a user terminal. The base station includes two TRPs, each TPR includes multiple panels, and each panel may configure different beams through a beam forming. The beams in FIG. 5 may be sending beams or receiving beams. The base station may schedule the UE to send an uplink transmission by using multiple beams. For example, the base station schedules the UE to send the uplink transmission by using both beam A and beam C, while the base station receives with a same beam, for example beam 2 receives uplink transmissions sent by the beam A and the beam C of the UE; or the base station receives an uplink transmission sent by the beam A of the UE by adopting the beam 2, and receives an uplink transmission sent by the beam C of the UE by adopting a beam 12; or the base station receives the uplink transmission sent by the beam A of the UE by adopting the beam 2, and receives the uplink transmission sent by the beam C of the UE by adopting a beam 2' of the TRP2.

Example 1

Figure 6:
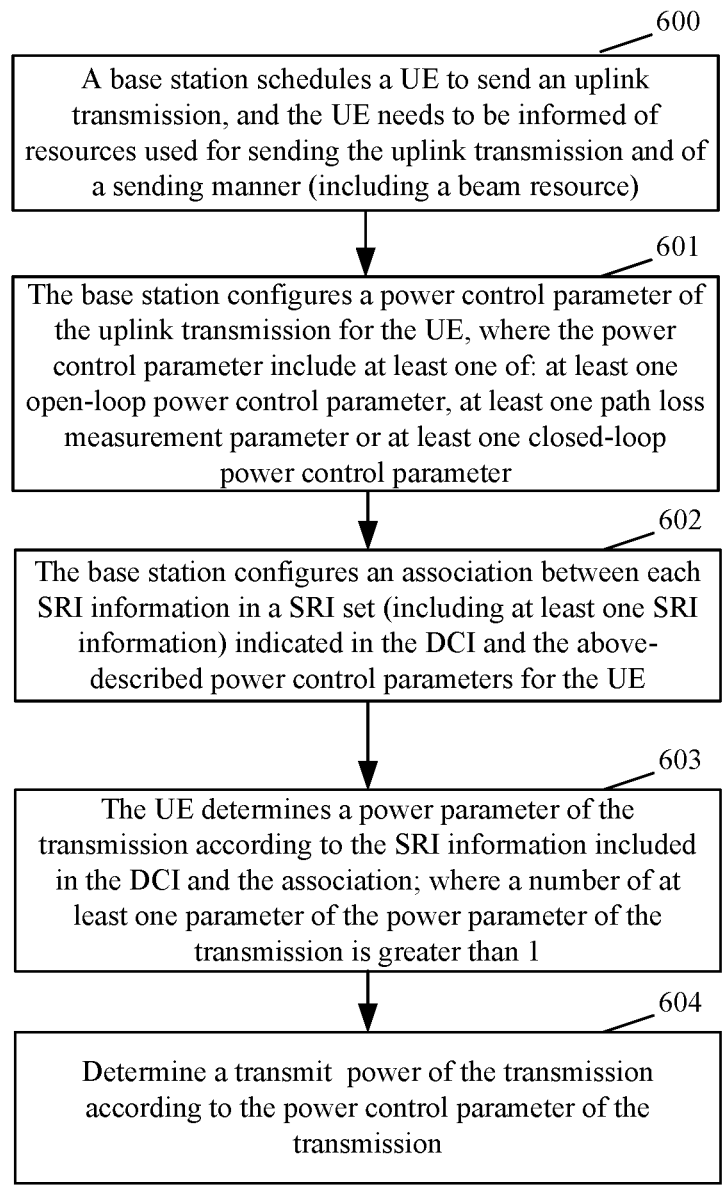
FIG. 6 is a flowchart of a power control method in an example 1 of an embodiment of the present disclosure.

Referring to FIG. 6, the power control method includes steps described below.

In step 600, a base station schedules a UE to send an uplink transmission, and the UE needs to be informed of resources used for sending the uplink transmission, including a beam resource.

In this step, the beam resource is indicated by a reference signal resource. For example, the base station schedules the UE to send a PUSCH, DCI includes SRI information, and then the PUSCH determines a sending manner according to a SRS resource indicated by the SRI information, where the sending manner includes that a transmit power of the PUSCH is determined according to the SRS resource.

In step 601, the base station configures a power control parameter of the uplink transmission for the UE, where the power control parameter include at least one of: at least one open-loop power control parameter, at least one path loss measurement parameter or at least one closed-loop power control parameter.

In step 602, the base station configures an association between each SRI information in a SRI set (including at least one SRI information) indicated in the DCI and the above-described power control parameters for the UE.

In this step, when the SRI information indicates multiple SRS resources, a number of at least one parameter of the power control parameter associated with the SRI information is greater than 1.

When a number of the SRS resource indicated by the SRI information is M, a number of the power control parameter associated with the SRI information is 1 to M, and M is an integer.

When a number of parameters of the power control parameter is 1, all SRS resources indicated by the SRI information share this power control parameter.

When a number of parameters of the power control parameter is M, each SRS resource indicated by the SRI information corresponds to one of the M power control parameters.

When a number of the parameters of the power control parameter is N, and N is an integer greater than 1 and less than M, the SRS resources indicated by the SRI information are divided into a number N of groups which respectively correspond to N power control parameters.

For example, the base station configures an SRS resource set for a transmission mode being the non-codebook based transmission of a UE, and the SRS resource set includes 4 SRS resources, i.e., SRS1 to SRS4. When SRI information is used in DCI to indicate the used SRS resources, there are at most 15 combinations, which are as follows:

SRI0: SRS1
SRI1: SRS2
SRI2: SRS3
SRI3: SRS4
SRI4: SRS1 SRS2
SRI5: SRS1 SRS3
SRI6: SRS1 SRS4
SRI7: SRS2 SRS3
SRI8: SRS2 SRS4
SRI9: SRS3 SRS4
SRI10: SRS1 SRS2 SRS3
SRI11: SRS1 SRS2 SRS4
SRI12: SRS1 SRS3 SRS4
SRI13: SRS2 SRS3 SRS4
SRI14: SRS1 SRS2 SRS3 SRS4

The above SRI4 is taken as an example, a power control parameter associated with the SRI4 may include 2 open-loop power control parameters, 2 closed-loop power control parameters and 2 path loss measurement parameters, then two sets of power control parameters respectively correspond to two SRS in the SRI4, i.e., the SRS1 and the SRS2, where one set of power control parameters include 1 open-loop power control parameter, 1 closed-loop power control parameter and 1 path loss measurement parameter.

The above SRI4 is taken as an example, the power control parameter associated with the SRI4 may further include 2 open-loop power control parameters, 2 closed-loop power control parameters and 1 path loss measurement parameter. If there is only 1 path loss measurement parameter, then this path loss measurement parameter is shared between the SRS1 and the SRS2; and if a number of the open-loop power control parameter and a number of the closed-loop power control parameter are both 2, then the two open-loop power control parameters respectively correspond to the SRS1, and the two closed-loop power control parameters respectively correspond to the SRS2.

The above SRI10 is taken as an example, a power control parameter associated with the SRI10 may include 1 open-loop power control parameter, 1 closed-loop power control parameter and 1 path loss measurement parameter, then the SRS1, the SRS2 and the SRS3 share these power control parameters.

The above SRI10 is taken as an example, the power control parameter associated with the SRI10 may further include 3 open-loop power control parameters, 3 closed-loop power control parameter and 3 path loss measurement parameters, then the SRS1, the SRS2 and the SRS3 respectively use one set of power control parameters therein; where the one set of power control parameters include 1 open-loop power control parameter, 1 closed-loop power control parameter and 1 path loss measurement parameter.

The above SRI10 is taken as an example, the power control parameter associated with the SRI10 may further include 3 open-loop power control parameters, 1 closed-loop power control parameter and 3 path loss measurement parameters, then the SRS1, the SRS2 and the SRS3 share the 1 closed-loop power control parameter, the SRS1, the SRS2 and the SRS3 use one of the above-described 3 open-loop power control parameters, respectively, and the SRS1, the SRS2 and the SRS 3 use one of the above-described 3 path loss measurement parameters, respectively.

The above SRI10 is taken as an example, the power control parameter associated with the SRI10 may further include 2 open-loop power control parameters, 2 closed-loop power control parameters and 2 path loss measurement parameters, then the SRS1, the SRS2 and the SRS3 are divided into two groups, and each group uses one set of the above-described two sets of power control parameters; where one set of power control parameters include 1 open-loop power control parameter, 1 closed-loop power control parameter and 1 path loss measurement parameter.

The above SRI14 is taken as an example, a power control parameter associated with the SRI14 may include 2 open-loop power control parameters, 2 closed-loop power control parameters and 1 path loss measurement parameter, then the SRS1, the SRS2, the SRS3 and the SRS4 are divided into two groups, each group uses one of the 2 open-loop power control parameters, respectively, each group uses one of the 2 closed-loop power control parameters, and all SRS share 1 path loss measurement parameter, respectively.

In step 603, the UE determines a power parameter of the transmission according to the SRI information included in the DCI and the association; where a number of at least one parameter of the power parameter of the transmission is greater than 1.

In this step, the power control parameter of the transmission may be determined by adopting any one of following methods.

According to method one, a power control parameter associated with the SRI information of the transmission in the association is taken as the power control parameter of the transmission.

According to method two, a power control parameter associated with all first specific SRI information in the association is taken as the power control parameter of the transmission; where each of the all first specific SRI information indicates one of the reference signal resources indicated by the space domain resource information.

The above SRI4 is taken as an example, it indicates the SRI1 and the SRI2, where the SRI1 corresponds to the SRI0, and the SRI2 corresponds to the SRI1, then the SRI4 may determine a transmit power transmitted on the SRI1 according to the power control parameter associated with the SRI0 and determine a power control parameter transmitted on the SRS2 according to the power control parameter associated with the SRI1.

According to method three, a power control parameter of each reference signal resource group of the SRI information is determined according to the association, and a power control parameter of all reference signal resource groups of the SRI information is taken as the power control parameter of the transmission.

In the method three, the power control parameter of each reference signal resource group of the SRI information may be determined by adopting any one of following methods.

1. A power control parameter of each reference signal resource group of the SRI information is determined according to the power control parameter associated with all second specific SRI information in the association; where each of the all second specific SRI information indicates one reference signal resource in the reference signal resource group.
2. A power control parameter associated with a third SRI resource information in the association is taken as a power control parameter of the reference signal resource group; where the third specific SRI information indicates all reference signal resources in the reference signal resource group.

The above-described SRI14 is taken as an example, it indicates that the SRS1, the SRS2, the SRS3 and the SRS4 may correspond to different groups, assuming that a number of groups is 2, a group 1 includes the SRS1 and the SRS2, and a group 2 includes the SRS3 and the SRS4, then power control parameters corresponding to the two groups are determined by adopting one of following manners.

In manner 1, a power control parameter of the group 1 is obtained according to the power control parameter of the SRI0 indicating the SRS1 and the power control parameter of the SRI1 indicating the SRS2; and a power control parameter of the group 2 is obtained according to the power control parameter of the SRI2 indicating the SRS3 and the power control parameter of the SRI3 indicating the SRS4.

In manner 2, a power control parameter of the group 1 is obtained according to the power control parameter of the SRI4 indicating the SRS1 and the SRS2; and a power control parameter of the group 2 is obtained according to the power control parameter of the SRI9 indicating the SRS3 and the SRS4.

In the method three, the UE may group the reference signal resources contained in the SRI information by adopting any one of following methods.

1. The reference signal resources contained in the space domain resource information may be grouped according to members of a predefined group, namely, a group to which the SRS resource in the SRS resource set belongs is predefined.

For example, when 4 SRS resources (SRS1 through SRS4) are included in the SRS resource set, where the SRS1 and the SRS2 belong to the group 1, and the SRS3 and the SRS4 belong to the group 2, then there is only one group in the SRI4 indicating the SRS1 and the SRS2.

2. The reference signal resources contained in the space domain resource information may be grouped according to members of a group determined according to a predetermined rule based on a number of a predefined or configured group.

The predetermined rule includes: M members are divided into a number N of groups, where M and N are positive integers, and M is greater than or equal to N; when M may be exactly divided by N, each group includes M/N members, and the M members are sequentially distributed to the N groups; if M=4 and N=2, then the first two SRS resources are in the group 1, and the last two SRS resources are in the group 2; when M may not be exactly divided by N, assuming that the remainder obtained by dividing M by N is X, a number of members contained in the first X groups is M/N rounding down plus 1, and a number of members contained in the remaining groups is M/N rounding down; for example, M=5, N=2, M/N down takes an integer of 2 and the remainder is 1, then the group 1 includes the first 3 SRS resources and the group 2 includes the last 2 SRS resources.

For example, each of the SRI4 to the SRI9 described above indicates two SRS resources, and when a number of groups is 2, each group includes one SRS resource.

For another example, each of the SRI10 to the SRI13 described above indicates three SRS resources, when a number of groups is 2, the first two SRS resources belong to the group 1, and the next SRS resource belongs to the group 2.

For another example, the SRI14 indicates four SRS resources, when a number of groups is 2, the first two SRS belong to the group 1, and the last two SRS belong to the group 2.

For another example, when a number of groups is 1, all SRIs have only one group.

3. The reference signal resources contained in the space domain resource information may be grouped according to members of a group configured by the base station.

For example, the group 1 includes the SRS1, the SRS2 and the SRS3, and the group 2 includes the SRS4. The SRI only including the SRS1, the SRS2 and the SRS3 and any combination thereof only includes one set of power control parameters, and the SRI only including any combination of the SRS1, the SRS2 and the SRS3 as well as the SRS4 corresponds to two sets of power control parameters.

In step 604, a transmit power of the transmission is determined according to the power control parameter of the transmission.

Example 2

An uplink transmission may be dynamically scheduled by uplink grant information (UL grant) contained in physical layer downlink control information (DCI), and may also be semi-statically scheduled. The former is referred to as a dynamic grant based transmission; the latter is referred to as a non-dynamic grant transmission, also referred to as a configured grant transmission. The configured grant transmission is divided into two types: for a transmission of a type 1, all grant information is configured by high-layer signaling; for a transmission of a type 2, the high-layer signaling configures a portion of grant information, and the other portion of the grant information is sent via physical layer control signaling, which is valid for at least one transmission.

In the related art, the dynamic grant based transmission supports a multi-beam scenario, but does not support an application of the configured grant transmission in the multi-beam scenario. Since beam sets used by two transmission manners are essentially the same, the two transmission manners have commonality in an aspect of the configuration of the power control parameter.

A power control parameter of the configured grant transmission may be determined by adopting any one of following methods.

For the transmission of the type 1, a power control parameter of the transmission of the type 1 may be determined by adopting any one of following methods.

According to method one, space domain resource information and a power control parameter related to a currently configured space resource are configured by the high-layer signaling, and when the space domain resource information is updated in the high-layer signaling, a current power control parameter also needs to be updated.

The space domain resource information is for example SRI information, or a spatial relationship.

For example, a sending manner of the transmission of the type 1 at a moment t1 refers to SRI_1, the high-layer signaling configures the SRI_1, and configures a corresponding power control parameter. A sending manner of the transmission of the type 1 at a moment t2 is updated to refer to SRI_2, the high-layer signaling configures the SRI_2 and updates a power control parameter.

According to method two, space domain resource information is configured by the high-layer signaling, the high-layer signaling configures an association between at least one space domain resource information and a power control parameter, and a respective power control parameter may be obtained through the space domain resource information. The high-layer signaling configures the space domain resource information, so that a respective power control parameter may be obtained. When the space domain resource information is updated in the high-layer signaling, a new power control parameter is obtained according to new space domain resource information.

The space domain resource information is for example SRI information, or a spatial relationship.

For example, the high-layer signaling configures an association between 2 beam related information and the power control parameter for the transmission of the type 1, SRI_1 is associated with a first set of power control parameters, and SRI_2 is associated with a second set of power control parameters. At a moment t1, a sending manner refers to the SRI_1, and the SRI_1 is configured by the high-layer signaling, so that a sending end may obtain a corresponding first set of power control parameters. At a moment t2, the sending manner is updated to refer to the SRI_2, and the high-layer signaling configures the SRI_2, then the sending end may obtain a corresponding second set of power control parameters.

According to method three, the high-layer signaling configures an association between at least one space domain resource information and the power control parameter, the space domain resource information is indicated by MAC signaling, and a respective power control parameter may be obtained by the space domain resource information.

The MAC signaling described above includes one of: space domain resource information of a semi-static PUSCH, or space domain resource information of a PUCCH.

The space domain resource information at least includes one of: SRI information or a spatial relationship.

For example, the high-layer signaling configures an association between 2 space domain resource information and the power control parameter for the transmission of the type 1, SRI_1 is associated with a first set of power control parameters, and SRI_2 is associated with a second set of power control parameters.

When the MAC signaling includes space domain resource information of semi-static PUSCH, the space domain resource information at the moment t1 is the SRI_1, and MAC layer signaling configures the SRI_1 for the transmission of the type 1, the sending end may acquire a corresponding first set of power control parameters. At a moment t2, the space domain resource information is updated to refer to the SRI_2, the MAC layer signaling configures the SRI_2 for the transmission of the type 1, and then the sending end may acquire a corresponding second set of power control parameters.

When the MAC signaling includes the space domain resource information of the PUCCH, the semi-static PUSCH may also reuse the space domain resource information of the PUCCH, at least including space domain resource information related to the beam, such as SRI information, a spatial relation. At this time, the high-layer signaling configures, for the transmission of the type 1, an association between at least one space domain resource information and the power control parameter, where the space domain resource information is the space domain resource information of the PUCCH.

For the transmission of the type 2, a power control parameter of the transmission of the type 1 may be determined by adopting any one of following methods.

According to method one, space domain resource information and a power control parameter related to a currently configured space domain resource are both configured by the high-layer signaling, and when the space domain resource information is updated in the high-layer signaling, a current power control parameter also needs to be updated.

According to method two, space domain resource information is configured by the high-layer signaling, the high-layer signaling configures an association between at least one space domain resource information and the power control parameter, and a respective power control parameter may be obtained through the space domain resource information. The high-layer signaling configures the space domain resource information, so that the respective power control parameter may be obtained. When the space domain resource information is updated in the high-layer signaling, a new power control parameter is obtained according to new space domain resource information.

The space domain resource information is for example SRI information, or a spatial relationship.

According to method three, the high-layer signaling configures an association between at least one space domain resource information and the power control parameter, the space domain resource information is indicated by MAC signaling, and a respective power control parameter may be obtained by the space domain resource information.

The MAC signaling described above includes one of: space domain resource information of a semi-static PUSCH, or space domain resource information of a PUCCH.

The space domain resource information at least includes one of: SRI information or a spatial relationship.

According to method four, the high-layer signaling configures an association between at least one space domain resource information and the power control parameter, the space domain resource information is indicated by physical layer control signaling, and a respective power control parameter may be obtained through the space domain resource information.

The physical layer control signaling described above includes at least one of: DCI of grant information for PUSCH, or DCI of grant information for semi-statically scheduled PUSCH.

For the transmission of the type 1 and the transmission of the type 2, an association between multiple space domain resource information and the power control parameter may also be reused the association of space domain resource information, which is configured by part or all of the high-level signaling for the grant based transmission, and the power control parameter.

Example 3

An uplink transmission may support different service types, at least support an Enhanced Mobile Broadband (eMBB) and Ultra-high Reliable Ultra-Low Latency Communication (URLLC). The URLLC is an emergency low latency service and has high requirements for quality of service, thus a relatively high transmit power is required.

At present, in the related art, different space domain resource information may correspond to different power control parameters, different scheduling manners may also correspond to different power control parameters, and however, different requirements of different service types for power cannot be distinguished.

This example proposes one of following manners to support a difference in transmit power for different service types.

Manner One: (Amount of Power Enhancement of the URLLC Compared to the eMBB)

A transmit power offset of a service type of the transmission relative to a basic service type of the transmission is predefined.

For example, a transmit power offset of a URLLC service relative to an eMBB service is predefined. At this point, the eMBB service is the basic service type, and the URLLC is a non-basic service type. The service type of the transmission may be one or more. Assuming that the service type of the transmission is of one type, i.e., the URLLC, when the predefined transmit power difference is 3 dB, for a certain scheduling manner, space domain resource information is determined, a set of power control parameters are obtained, and a transmit power of the transmission of which a scheduling service type is the eMBB is obtained according to grant information and a power control parameter associated with the grant information; and when the scheduling service type is the URLLC, a sum of a transmit power obtained according to the grant information and a power control parameter associated with the grant information and the above-described transmit power offset 3 dB is required to be a transmit power of the uplink transmission.

Different transmit power offsets are predefined and correspond to different service types respectively.

For example, if only eMBB and URLLC services are supported, 2 transmit power offset values are defined and correspond to the two services respectively; if eMBB, URLLC, and massive Machine Type of Communication (mMTC) are supported, then 3 transmit power offset values are defined, and correspond to the three services respectively.

The transmit power offsets described herein may also refer to transmit power spectral density differences.

The predefined manner described above may also be that the base station is configured by high-layer signaling. Namely, the base station configures a transmit power offset of a first service type relative to a basic service type for the UE, or the base station configures different transmit power offsets for the UE, and the different transmit power offsets correspond to different service types respectively, so that there is a difference in the transmit power between the different service types.

The predefined manner described above may also be that the base station is indicated by physical layer signaling or high-layer signaling. That is, the base station indicates a transmit power offset of a currently scheduled transmission relative to the basic service type for the UE through the physical layer signaling, so as to realize the difference between a transmit power of a current service type and a transmit power of the basic service type.

The adjustment of the transmit power offset only aims at uplink transmission indicated by grant information in the physical layer signaling, such as DCI. For the grant based transmission, one DCI schedules one PUSCH transmission; and for a configured grant transmission of a type 2, one DCI schedules at least one PUSCH transmission.

The transmit power offset predefined or configured through the physical layer signaling or the high layer signaling described above may be used for all space domain resource information of the UE, and may also be applied to a space domain resource information group, namely, the transmit power offset is predefined or configured through high layer signaling for the space domain resource information group. The space domain resource information group is explicitly configured, or the group is determined according to the configuration information of the SRS resource or the SRS resource set.

Manner Two:

For the uplink transmission configured with the space domain resource information, an association between at least one space domain resource information and a power control parameter is configured through high-level signaling, and a respective power control parameter may be obtained through the space domain resource information. A number of an open-loop power control parameter of the power control parameter associated with one space domain resource information is greater than 1, and the open-loop power control parameter is respectively used for supporting different transmission service types.

The open-loop power control parameter includes at least one of: target receiving power or a path loss factor.

For example, when there are two service types supported for the transmission, i.e., eMBB and URLLC respectively, each space domain resource information is associated with 2 open-loop power control parameters, which corresponds to eMBB and URLLC respectively. The eMBB and the URLLC are not distinguished in other power control parameters.

Or, when there are two service types supported for the transmission, i.e., eMBB and URLLC respectively, each space domain resource information is associated with 2 target receiving powers in the open-loop power control parameter, and the 2 target receiving powers correspond to the eMBB and the URLLC respectively. The eMBB and the URLLC are not distinguished in other power control parameters.

For an uplink transmission not configured with the space domain resource information, power control parameters are directly configured through the high-level signaling. A number of the open-loop power control parameter included in the power control parameter is greater than 1, and the open-loop power control parameter is respectively used for supporting different service types of the transmission. The service types are not distinguished in other power control parameters.

Manner Three:

For an uplink transmission configured with the space domain resource information, an association between at least one space domain resource information and a power control parameter is configured through the high-level signaling, and a respective power control parameter may be obtained through the space domain resource information. A number of a closed-loop power control parameter in the power control parameter associated with one space domain resource information is greater than 1, and the closed-loop power control parameter is respectively used for supporting different service types of the transmission. The service types are not distinguished in other power control parameters.

The closed-loop power control parameter include at least one of: a closed-loop power control process identifier set or a number of closed-loop power control processes.

For example, when there are 2 service types supported for the transmission, i.e., eMBB and URLLC, respectively, each space domain resource information is associated with 2 closed-loop power control parameters, which corresponds to the eMBB and the URLLC, respectively. For example, the eMBB corresponds to a closed-loop power control process 1, and the URLLC corresponds to a closed-loop power control process 2. The eMBB and the URLLC are not distinguished in other power control parameters.

For uplink transmission not configured with the space domain resource information, a power control parameter is directly configured through high-level signaling. A number of the closed-loop power control parameter included in the power control parameter is greater than 1, and the closed-loop power control parameter are respectively used for supporting different service types of the transmission. The service types are not distinguished in other power control parameters.

Manner Four:

For uplink transmission configured with the space domain resource information, an association between at least one space domain resource information and a power control parameter is configured through high-level signaling, and a respective power control parameter may be obtained through the space domain resource information. The power control parameter associated with one space domain resource information includes a number N of open-loop power control parameter and a number N of closed-loop power control parameter, which are respectively used for supporting different service types of the transmission. The service types are not distinguished in other power control parameters.

For uplink transmission not configured with the space domain resource information, a power control parameter is directly configured through high-level signaling. The configured power control parameter includes a number N of open-loop power control parameter and a number N of closed-loop power control parameter, which are respectively used for supporting different service types of the transmission. The service types are not distinguished in other power control parameters.

Manner Five:

For uplink transmission configured with the space domain resource information, an association between at least one space domain resource information and a power control parameter is configured through high-level signaling, and a respective power control parameter may be obtained through the space domain resource information. The power control parameter associated with one space domain resource information includes a number N of open-loop power control parameter, a number N of closed-loop power control parameter and a number N of path loss measurement parameters, which are respectively used for supporting different service types of the transmission. N is a number of supported service types, and N is a positive integer.

For uplink transmission not configured with the space domain resource information, a power control parameter is directly configured through high-level signaling. The power control parameter include a number N of open-loop power control parameter, a number N of closed-loop power control parameter and a number N of path loss measurement parameters, which are respectively used for supporting different service types of the transmission. N is a number of supported service types, and N is a positive integer.

For convenience of description, the embodiments of the present disclosure are described by adopting a base station and a user equipment (UE), but not as a limitation on the embodiments of the present disclosure. In an implementation, the base station and the UE may be replaced by names of various communication nodes, such as NodeB (NB), gNB, TRP, Access Point (AP), station, user, STA, relay, terminal. The base station may also refer to a network, a Universal Terrestrial Radio Access (UTRA), an Evolved Universal Terrestrial Radio Access, etc.

Figure 7:
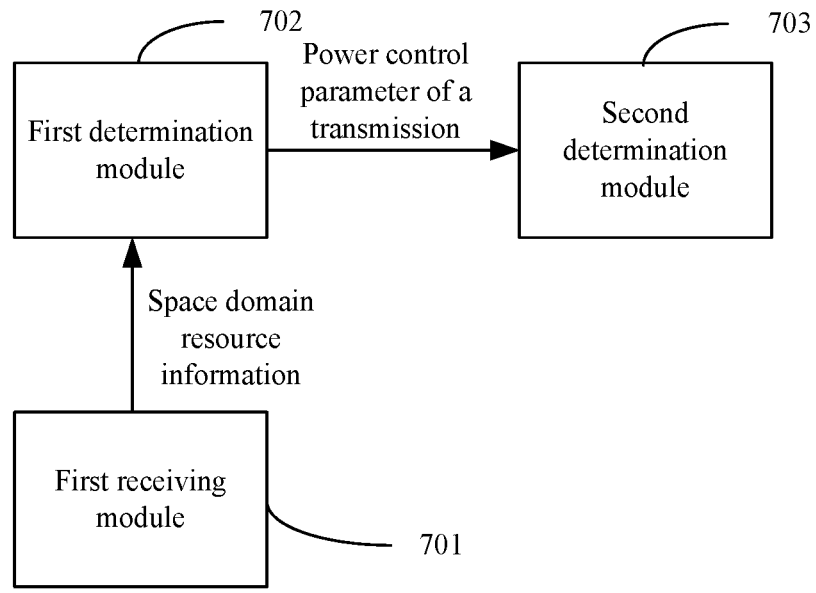
FIG. 7 is a schematic diagram of a structural composition of a power control device proposed by another embodiment of the present disclosure.

Referring to FIG. 7, another embodiment of the present disclosure provides a power control device. The power control device includes a first receiving module 701, a first determination module 702 and a second determination module 703. The first receiving module 701 is configured to receive space domain resource information of a transmission. The first determination module 702 is configured to determine a power control parameter of the transmission according to the space domain resource information of the transmission and an association between space domain resource information and power control parameter, where a number of at least one parameter of the power control parameter of the transmission is greater than 1. The second determination module 703 is configured to determine a transmit power of the transmission according to the power control parameter of the transmission.

In an embodiment of the present disclosure, the power control parameter includes at least one of: an open-loop power control parameter, a closed-loop power control parameter, or a path loss measurement parameter.

In an embodiment of the present disclosure, the open-loop power control parameter includes at least one of: target receiving power or a path loss factor. The path loss measurement parameter includes at least one of: a reference signal resource type indicator for a path loss measurement, or a reference signal resource indicator for the path loss measurement. The closed-loop power control parameter includes at least one of: a closed-loop power control process identifier, or a number of closed-loop power control processes.

In an embodiment of the present disclosure, the transmit power of the transmission includes a transmit power of at least one sub-transmission.

In an embodiment of the present disclosure, the first determination module 702 is specifically configured to determine the power control parameter of the transmission by adopting any one of following methods: a power control parameter associated with the space domain resource information of the transmission in the association is taken as the power control parameter of the transmission; a power control parameter associated with all first specific space domain resource information in the association is taken as the power control parameter of the transmission, where each of the all first specific space domain resource information indicates one of reference signal resources indicated by the space domain resource information of the transmission; or a power control parameter of each reference signal resource group indicated by the space domain resource information of the transmission is determined according to the association, and a power control parameter of all reference signal resource groups indicated by the space domain resource information of the transmission is taken as the power control parameter of the transmission.

In an embodiment of the present disclosure, the first determination module 702 is specifically configured to determine the power control parameter of each reference signal resource group of the space domain resource information of the transmission according to the association by adopting any one of following methods: the power control parameter of the reference signal resource group of the transmission is determined according to a power control parameter associated with all second specific space domain resource information in the association, where each of the all second specific space domain resource information indicates one reference signal resource in the reference signal resource group; or a power control parameter associated with third specific space domain resource information in the association is taken as the power control parameter of the reference signal resource group, where the third specific space domain resource information indicates all reference signal resources in the reference signal resource group.

In an embodiment of the present disclosure, the first determination module 702 is specifically configured to group the reference signal resources indicated by the space domain resource information by adopting any one of following methods: the reference signal resources contained in the space domain resource information may be grouped according to members of a predefined group; the reference signal resources contained in the space domain resource information may be grouped according to members of a group determined according to a predetermined rule based on a number of a predefined or configured group; or the reference signal resources contained in the space domain resource information may be grouped according to members of a configured group.

In an embodiment of the present disclosure, there is an association between the reference signal resource group and the transmit power of the sub-transmission.

In an embodiment of the present disclosure, the first determination module 702 is specifically configured to determine the power control parameter of the transmission according to a specific type of the transmission, the association, and the space domain resource information of the transmission, where the specific type includes a service type or a scheduling type.

In an embodiment of the present disclosure, the second determination module 703 is specifically configured to determine an initial transmit power of the transmission according to the power control parameter of the transmission; and determining a final transmit power of the transmission according to the initial transmit power of the transmission and a predefined transmit power offset of a specific type of the transmission relative to a basic specific type of the transmission, where the specific type includes a service type or a scheduling type.

In an embodiment of the present disclosure, the space domain resource information includes at least one of: reference signal resource information or spatial relationship information.

In an embodiment of the present disclosure, the power control parameter includes at least one of: an open-loop power control parameter, a path loss measurement parameters, or a closed-loop power control parameter.

The specific implementation process of the power control device described above is the same as the specific implementation process of the previous embodiments and examples, which will not be repeated here.

Figure 8:
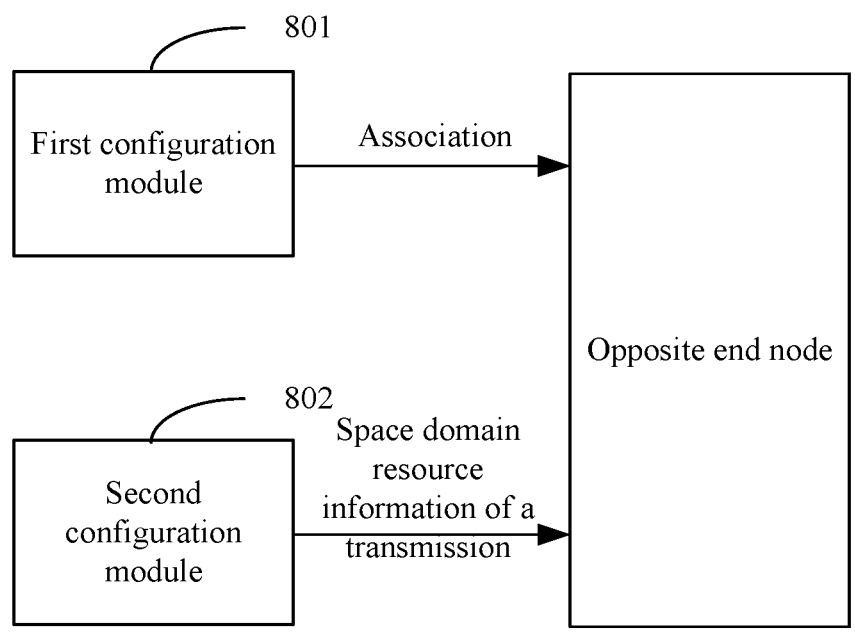
FIG. 8 is a schematic diagram of a structural composition of a power control device proposed by another embodiment of the present disclosure.

Referring to FIG. 8, another embodiment of the present disclosure provides a power control device. The power control device includes a first configuration module 801 and a second configuration module 802. The first configuration module 801 is configured to configure an association between space domain resource information and power control parameter. The second configuration module 802 is configured to configure or indicate space domain resource information of a transmission.

In an embodiment of the present disclosure, the second configuration module 802 is specifically configured to configure or indicate the space domain resource information of the transmission through at least one of: high-layer signaling, downlink control information, medium access control signaling, or physical layer control signaling.

In an embodiment of the present disclosure, all reference signal resources indicated by the space domain resource information share the power control parameter; or, where each reference signal resource indicated by the space domain resource information corresponds to one parameter of the power control parameter; or where reference signal resources indicated by the space domain resource information are divided into a number N of groups, where N is an integer larger than 1 and less than M, and each group corresponds to one parameter of the power control parameter.

In an embodiment of the present disclosure, a number of any one parameter of the power control parameter associated with the space domain resource information is any one of 1 to M, and M is a number of the reference signal resources indicated by the space domain resource information; when a number of parameters of the power control parameter associated with the space domain resource information is 1, all reference signal resources indicated by the space domain resource information share the parameter; when a number of parameters of the power control parameter associated with the space domain resource information is M, each reference signal resource indicated by the space domain resource information corresponds to one of the M parameters; and when a number of parameters of the power control parameter associated with the space domain resource information is N, and N is an integer larger than 1 and less than M, reference signal resources indicated by the space domain resource information are divided into a number N of groups, and each group corresponds to one of the N parameters In an embodiment of the present disclosure, a number of any one parameter of the power control parameter associated with the space domain resource information is any one of 1 to X, where X is a number of a specific type supported by the transmission, the specific type includes a service type or a scheduling type; when a number of parameters of the power control parameter associated with the space domain resource information is 1, all specific types supported by the transmission share the parameter; when a number of parameters of the power control parameter associated with the space domain resource information is X, each specific type supported by the transmission corresponds to one of the X parameters; and when a number of parameters of the power control parameter associated with the space domain resource information is Y, Y being an integer larger than 1 and less than X, all specific types supported by the transmission are divided into Y groups, and each group corresponds to one of the Y parameters.

The specific implementation process of the power control device described above is the same as the specific implementation process of the previous embodiments and examples, which will not be repeated here.

Figure 9:
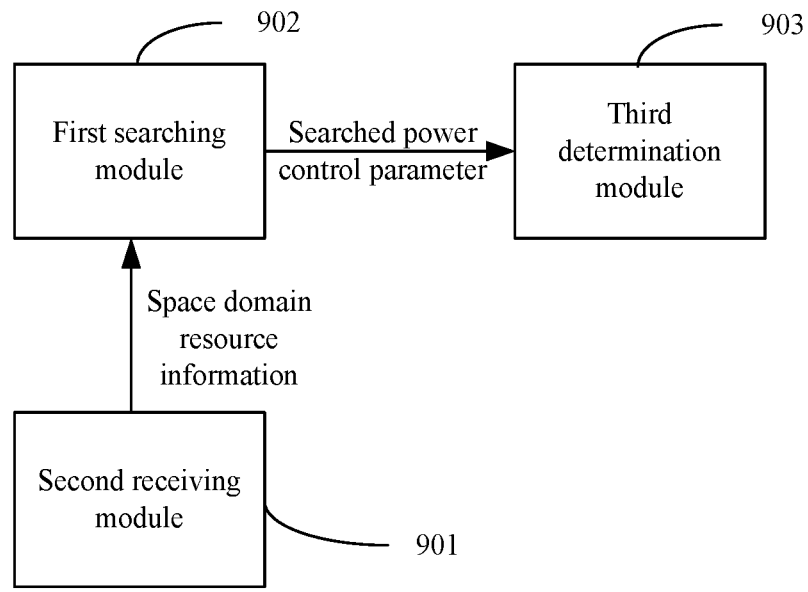
FIG. 9 is a schematic diagram of a structural composition of a power control device proposed by another embodiment of the present disclosure.

Referring to FIG. 9, another embodiment of the present disclosure provides a power control device. The power control device includes a second receiving module 901, a first searching module 902 and a third determination module 903. The second receiving module 901 is configured to receive space domain resource information of a transmission. The first searching module 902 is configured to determine a power control parameter associated with the space domain resource information of the transmission in an association between space domain resource information and power control parameter, where a number of at least one parameter of the determined power control parameter is greater than 1. The third determination module 903 is configured to determine a power control parameter corresponding to a specific type of the transmission according to the determined power control parameter, where the specific type includes a service type or a scheduling type.

In an embodiment of the present disclosure, the third determination module 903 is specifically configured to: select the power control parameter corresponding to the specific type of the transmission from the determined power control parameter; and determine the power control parameter corresponding to the specific type of the transmission according to the determined power control parameter and a predefined power control parameter offset of the specific type of the transmission relative to a basic specific type of the transmission.

In an embodiment of the present disclosure, a number of any one parameter of the power control parameter associated with the space domain resource information is any one of 1 to X, where X is a number of the specific type supported by the transmission; where the specific type includes a service type or a scheduling type; when a number of parameters of the power control parameter associated with the space domain resource information is 1, all specific types supported by the transmission share the parameter; when a number of parameters of the power control parameter associated with the space domain resource information is X, each specific type supported by the transmission corresponds to one of the X parameters; and when a number of parameters of the power control parameter associated with the space domain resource information is N, and N is an integer larger than 1 and less than X, all specific types supported by the transmission are divided into N groups, and each group corresponds to one of the N parameters.

The specific implementation process of the power control device described above is the same as the specific implementation process of the previous embodiments and examples, which will not be repeated here.

Figure 10:
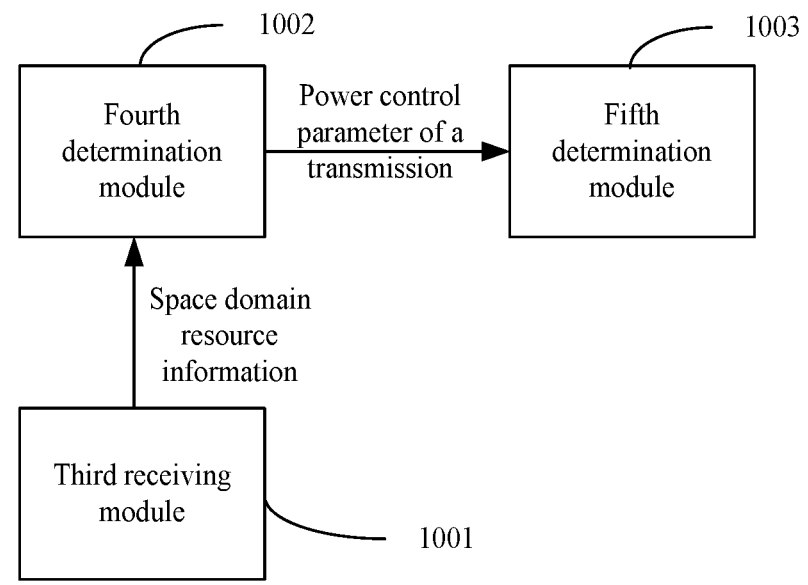
FIG. 10 is a schematic diagram of a structural composition of a power control device proposed by another embodiment of the present disclosure.

Referring to FIG. 10, another embodiment of the present disclosure provides a power control device. The power control device includes a third receiving module 1001, a fourth determination module 1002 and a fifth determination module 1003. The third receiving module 1001 is configured to receive space domain resource information of a transmission. The fourth determination module 1002 is configured to determine a power control parameter of the transmission according to the space domain resource information of the transmission and an association between space domain resource information and power control parameter. The fifth determination module 1003 is configured to determine an initial transmit power of the transmission according to the power control parameter of the transmission; determine a final transmit power of the transmission according to the initial transmit power and a predefined transmit power offset of a specific type of the transmission relative to a basic specific type of the transmission, where the specific type includes a service type or a scheduling type.

The specific implementation process of the power control device described above is the same as the specific implementation process of the previous embodiments and examples, which will not be repeated here.

Another embodiment of the present disclosure proposes a power control device. The power control device includes a processor and a computer readable storage medium. The computer readable storage medium has instructions stored therein, the instructions, when executed by the processor, implement any one of the power control methods described above.

Another embodiment of the present disclosure proposes a computer readable storage medium. A computer program is stored on the computer readable storage medium. The computer program, when executed by a processor, implements steps of any one of the power control methods described above.

For a Physical Uplink Shared Channel (PUSCH) transmission, the configured target receiving power P0 is divided into cell specific P0 denoted as P0_NOMINAL_PUSCH and UE-specific P0 denoted as P0_UE_PUSCH.

In the related art, when there is no real PUSCH transmission, a set of power control parameters need to be determined to calculate virtual power headroom (PH); where the virtual PH refers to a power headroom calculated according to a power control parameter of an assumed PUSCH transmission without the real PUSCH transmission when the PH is calculated.

The virtual PH is also referred to as a virtual PHR, or a reference PHR, or a PHR in a reference format.

The PH is the power headroom. The PHR is a PH report, i.e., a power headroom report.

The calculation of the PHR refers to calculation of the PH and composition of the PHR, and thus, calculating the PHR and calculating the PH may be exchanged.

When the real PUSCH transmission does not exist, the power headroom is calculated according to the power control parameter of the assumed PUSCH transmission, that is, the power headroom is calculated according to a reference PUSCH transmission.

Herein, a power control parameter used for calculating the virtual PH is a power control parameter used by the UE to calculate the PHR of a type 1 according to the reference PUSCH transmission.

In the related art, P0_UE_PUSCH and a of the power control parameter used for calculating the virtual PH are from a p0-PUSCH-AlphaSet set configured for the PUSCH of the UE, and determined by p0-PUSCH-AlphaSetId=0; where the path loss measurement parameter of the power control parameter is from a PUSCH-PathlossReferenceRS set configured for the PUSCH of the UE and is determined by PathlossReferenceRS-Id=0; where the closed-loop power control parameter of the power control parameter is fixed as a closed-loop power control numbering I=0.

Figure 11:
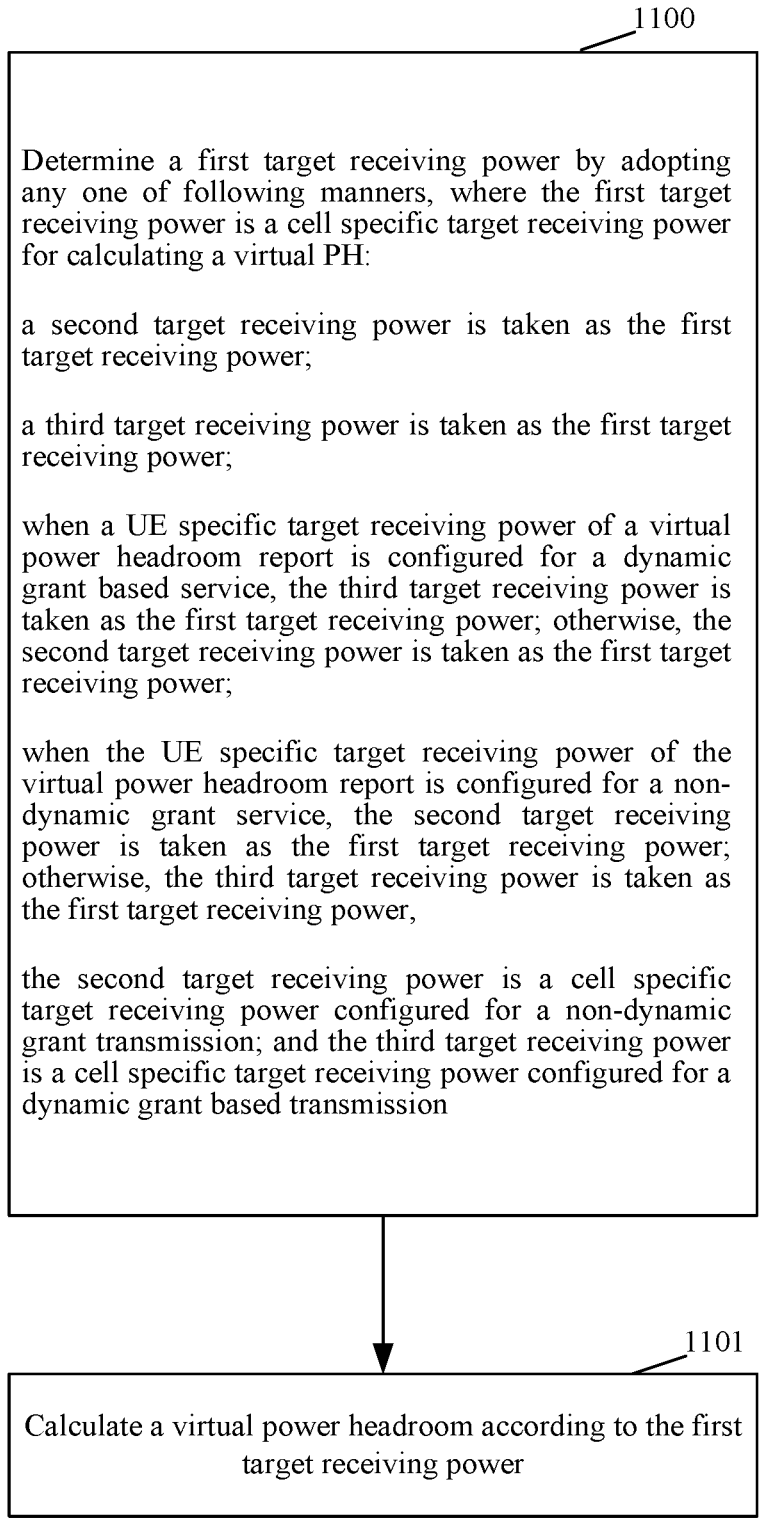
FIG. 11 is a flowchart of a method for determining target receiving power proposed by another embodiment of the present disclosure.

While the cell specific power control parameter P0_NOMINAL_PUSCH has different configurations for grant based PUSCH and grant free PUSCH, respectively. However, a method for determining a cell specific target receiving power is not given in the related art Referring to FIG. 11, another embodiment of the present disclosure proposes a method for determining target receiving power. The method includes steps described below.

In step 1100, a first target receiving power is determined by adopting any one of following manners, where the first target receiving power is a cell specific target receiving power for calculating a virtual PH: a second target receiving power is taken as the first target receiving power; a third target receiving power is taken as the first target receiving power; when a user equipment (UE) specific target receiving power of a virtual power headroom report is configured for a dynamic grant based service, the third target receiving power is taken as the first target receiving power, otherwise the second target receiving power is taken as the first target receiving power; when the UE specific target receiving power of the virtual power headroom report is configured for a non-dynamic grant service, the second target receiving power is taken as the first target receiving power, otherwise the third target receiving power is taken as the first target receiving power.

The second target receiving power is a cell specific target receiving power configured for a non-dynamic grant transmission, such as p0-NominalWithoutGrant; and the third target receiving power is a cell specific target receiving power configured for a dynamic grant based transmission, such as p0-NormalWithGrant.

In the embodiments of the present disclosure, a virtual PHR corresponds to a PHR of a scenario without the transmission. The cell specific target receiving power refers to P0_nominal.

In another embodiment of the present disclosure, the method further includes described below.

In step 1101, a virtual power headroom is calculated according to the first target receiving power.

In the embodiments of the present disclosure, P0_UE_PUSCH and a of a power control parameter used for calculating the virtual PH are from a p0-PUSCH-AlphaSet set configured for the PUSCH of the UE, and determined by p0-PUSCH-AlphaSetId=0; where the path loss measurement parameter of the power control parameter is from a PUSCH-PathlossReferenceRS set configured for the PUSCH of the UE and is determined by PathlossReferenceRS-Id=0; where the closed-loop power control parameter of the power control parameter is fixed as a closed-loop power control numbering I=0.

In an embodiment of the present disclosure, the virtual PH is also referred to as a reference PH, and the virtual PHR is also referred to as a reference PHR.

The above method is applicable to a scenario where the UE determines a PHR of a type 1 based on the reference PUSCH transmission.

The above method is also applicable to a scenario where the UE computes a PH of virtual type 1, also referred to as a virtual PH of the type 1, or a reference PH of the type 1.

Figure 12:
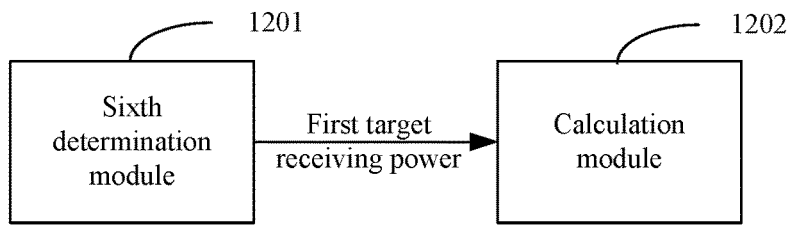
FIG. 12 is a schematic diagram of a structural composition of a device for determining target receiving power proposed by another embodiment of the present disclosure.

Referring to FIG. 12, another embodiment of the present disclosure proposes a device for determining target receiving power. The device includes a sixth determination module 1201. The sixth determination module 1201 is configured to determine a first target receiving power by adopting any one of following manners, where the first target receiving power is a cell specific target receiving power for calculating a virtual power headroom: a second target receiving power is taken as the first target receiving power; a third target receiving power is taken as the first target receiving power; when a UE specific target receiving power of a virtual power headroom report is configured for a dynamic grant based service, the third target receiving power is taken as the first target receiving power. otherwise the second target receiving power is taken as the first target receiving power; when the UE specific target receiving power of the virtual power headroom report is configured for a non-dynamic grant service, the second target receiving power is taken as the first target receiving power, otherwise the third target receiving power is taken as the first target receiving power.

The second target receiving power is a cell specific target receiving power configured for a non-dynamic grant transmission, and the third target receiving power is a cell specific target receiving power configured for a dynamic grant based transmission.

The specific implementation method of the device for determining the target receiving power is the same as that of the previous embodiments, which will not be repeated here.

Another embodiment of the present disclosure provides a device for determining target receiving power. The device includes a processor and a computer readable storage medium. The computer readable storage medium has instructions stored therein, and the instructions, when executed by the processor, implement any one of the methods for determining the target receiving power described above.

Another embodiment of the present disclosure provides a computer readable storage medium. A computer program is stored on the computer readable storage medium. The computer program, when executed by a processor, implements steps of the method for determining the target receiving power described above.

Figure 13:
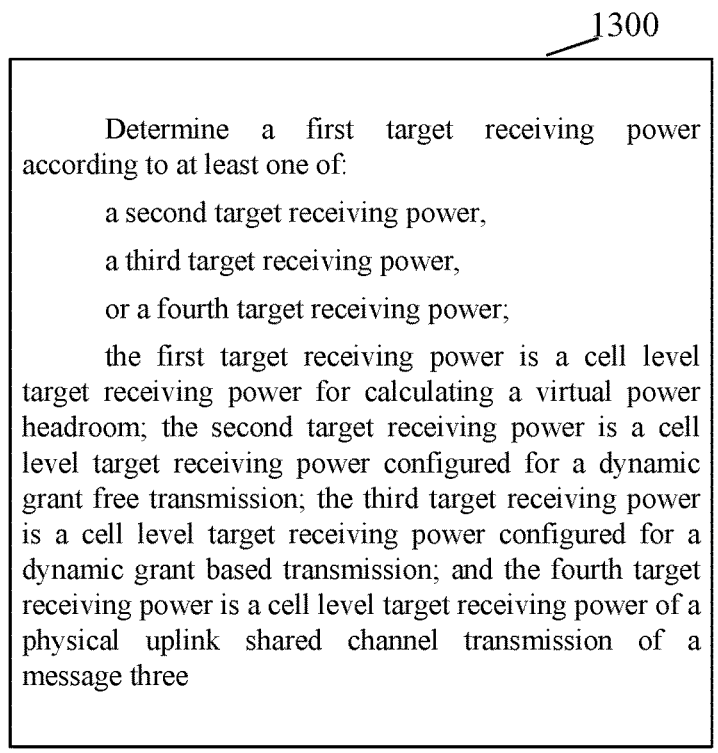
FIG. 13 is a flowchart of a method for determining target receiving power proposed by another embodiment of the present disclosure.

Referring to FIG. 13, another embodiment of the present disclosure proposes a method for determining target receiving power. The method includes steps described below.

In step 1300, a first target receiving power is determined according to at least one of: a second target receiving power, a third target receiving power, or a fourth target receiving power.

The first target receiving power is a cell specific target receiving power for calculating a virtual power headroom; the second target receiving power is a cell specific target receiving power configured for a non-dynamic grant transmission, i.e., p0-NominalWithoutGrant; the third target receiving power is a cell specific target receiving power configured for a dynamic grant based transmission, i.e., p0-NominalWithGrant; and the fourth target receiving power is a cell specific target receiving power of a physical uplink shared channel transmission of a message three (Msg3).

The Msg3 PUSCH transmission is a transmission of a third message in an uplink random access process, and the cell specific target receiving power of the Msg3 PUSCH transmission is composed of two parts: a preamble received target receiving power, i.e., preamble Received TargetPower, and a difference value between the Msg3 and the preamble, i.e., msg3-DeltaPreamble. Both parts are configured by a high layer parameter.

The first target receiving power described above is the cell specific target receiving power for calculating the virtual power headroom, and may also be described as a cell specific target receiving power of a power control parameter used by the UE for calculating the PHR of a type 1 according to a reference PUSCH transmission.

In an embodiment of the present disclosure, the step in which the first target receiving power id determined according to the second target receiving power includes: the second target receiving power is taken as the first target receiving power.

In an embodiment of the present disclosure, the step in which the first target receiving power is determined according to the third target receiving power includes: the third target receiving power is taken as the first target receiving power;

In an embodiment of the present disclosure, the step in which the first target receiving power is determined according to the fourth target receiving power includes: the fourth target receiving power is taken as the first target receiving power.

In an embodiment of the present disclosure, the step in which the first target receiving power is determined includes at least one of: when the second target receiving power is provided or configured, the second target receiving power is taken as the first target receiving power; when the second target receiving power is not provided or configured, the third target receiving power is taken as the first target receiving power; when the second target receiving power is not provided or configured, the fourth target receiving power is taken as the first target receiving power; when the third target receiving power is provided or configured, the third target receiving power is taken as the first target receiving power; when the third target receiving power is not provided or configured, the second target receiving power is taken as the first target receiving power; or when the third target receiving power is not provided or configured, the fourth target receiving power is taken as the first target receiving power.

The method for determining the first target receiving power described above may be used independently, may also be used in combination, or may be used in combination with other methods.

For example, when the second target receiving power is configured, the second target receiving power is taken as the first target receiving power; otherwise, when the third target receiving power is configured, the third target receiving power is taken as the first target receiving power; otherwise, the fourth target receiving power is taken as the first target receiving power.

For another example, when the third target receiving power is configured, the third target receiving power is taken as the first target receiving power; otherwise, when the second target receiving power is configured, the second target receiving power is taken as the first target receiving power; otherwise, the fourth target receiving power is taken as the first target receiving power.

For another example, when the second target receiving power is provided or configured, the second target receiving power is taken as the first target receiving power; when the second target receiving power is not provided or configured, and the third target receiving power is provided or configured, the third target receiving power is taken as the first target receiving power; when the second target receiving power is not provided or configured, and the third target receiving power is not configured, the fourth target receiving power is taken as the first target receiving power.

For another example, when the third target receiving power is provided or configured, the third target receiving power is taken as the first target receiving power; when the third target receiving power is not provided or configured, and the second target receiving power is provided or configured, the second target receiving power is taken as the first target receiving power; when the third target receiving power is not provided or configured, and the second target receiving power is not provided or configured, the fourth target receiving power is taken as the first target receiving power.

In an embodiment of the present disclosure, the step in which the first target receiving power is determined includes at least one of: when a parameter (such as configuredGrant-Config) of the non-dynamic grant transmission is provided or configured, the second target receiving power is taken as the first target receiving power; when the parameter of the non-dynamic grant transmission is not provided or configured, the third target receiving power is taken as the first target receiving power; when the parameter of the non-dynamic grant transmission is not provided or configured, the fourth target receiving power is taken as the first target receiving power; when a parameter (such as PUSCH-Config) of the dynamic grant based transmission is provided or configured, the third target receiving power is taken as the first target receiving power; or when the parameter of the dynamic grant based transmission is not provided or configured, the fourth target receiving power is taken as the first target receiving power.

The method for determining the first target receiving power described above may be used independently, or may also be used in combination.

For example, when the parameter (such as configuredGrantConfig) of the non-dynamic grant transmission is configured, the second target receiving power is taken as the first target receiving power; otherwise, the fourth target receiving power or the third target receiving power is taken as the first target receiving power.

For another example, when the parameter (such as PUSCH-Config) of the dynamic grant based transmission is configured, the third target receiving power is taken as the first target receiving power; otherwise, the fourth target receiving power is taken as the first target receiving power.

For another example, the parameter (such as configuredGrantConfig) of the non-dynamic grant transmission is provided or configured, the second target receiving power is taken as the first target receiving power; when the parameter of the non-dynamic grant transmission is not provided or configured, the fourth target receiving power or the third target receiving power is taken as the first target receiving power.

For another example, when the parameter (such as PUSCH-Config) of the dynamic grant based transmission is provided or configured, the third target receiving power is taken as the first target receiving power; when the parameter of the dynamic grant based transmission is not provided or configured, the fourth target receiving power is taken as the first target receiving power.

The parameter (such as configuredGrantConfig) of the non-dynamic grant transmission described above is also referred to as configuration information of a configured grant transmission for configuring the parameter of the non-dynamic grant transmission.

The parameter (e.g., PUSCH-Config) of the dynamic grant based transmission described above is also referred to as physical uplink shared channel configuration information.

In an embodiment of the present disclosure, the step in which the first target receiving power is determined includes at least one of: when a UE specific target receiving power for calculating the virtual power headroom is provided or configured for the dynamic grant based transmission, the third target receiving power is taken as the first target receiving power; when the UE specific target receiving power for calculating the virtual power headroom is not provided or configured for the dynamic grant based transmission, the second target receiving power is taken as the first target receiving power; when the UE specific target receiving power for calculating the virtual power headroom is not provided or configured for the dynamic grant based transmission, the fourth target receiving power is taken as the first target receiving power; when the UE specific target receiving power for calculating the virtual power headroom is provided or configured for the non-dynamic grant transmission, the second target receiving power is taken as the first target receiving power; when the UE specific target receiving power for calculating the virtual power headroom is not configured for the non-dynamic grant transmission, the third target receiving power is taken as the first target receiving power; or when the UE specific target receiving power for calculating the virtual power headroom is not provided or configured for the non-dynamic grant transmission, the fourth target receiving power is taken as the first target receiving power.

The method for determining the first target receiving power described above may be used independently, or may also be used in combination.

For example, when the UE specific target receiving power for calculating the virtual power headroom is not configured for the dynamic grant based transmission, the fourth target receiving power is taken as the first target receiving power; otherwise, the second target receiving power is taken as the first target receiving power.

For another example, when the UE specific target receiving power for calculating the virtual power headroom is not configured for the dynamic grant based transmission, the fourth target receiving power is taken as the first target receiving power; otherwise, the fourth target receiving power is taken as the first target receiving power.

For another example, when the UE specific target receiving power for calculating the virtual power headroom is configured for the non-dynamic grant transmission, the second target receiving power is taken as the first target receiving power; otherwise, the third target receiving power is taken as the first target receiving power.

For another example, when the UE specific target receiving power for calculating the virtual power headroom is configured for the non-dynamic grant transmission, the second target receiving power is taken as the first target receiving power; otherwise, the fourth target receiving power is taken as the first target receiving power.

For another example, when the UE specific target receiving power for calculating the virtual power headroom is not provide or configured for the dynamic grant based transmission, the fourth target receiving power is taken as the first target receiving power; when the UE specific target receiving power for calculating the virtual power headroom is provided or configured for the non-dynamic grant transmission, the second target receiving power is taken as the first target receiving power.

For another example, when the UE specific target receiving power for calculating the virtual power headroom is not provide or configured for the dynamic grant based transmission, the fourth target receiving power is taken as the first target receiving power; when the UE specific target receiving power for calculating the virtual power headroom is provided or configured for the non-dynamic grant transmission, the fourth target receiving power is taken as the first target receiving power.

For another example, when the UE specific target receiving power for calculating the virtual power headroom is provided or configured for the non-dynamic grant transmission, the second target receiving power is taken as the first target receiving power; when the UE specific target receiving power for calculating the virtual power headroom is provided or configured for the dynamic grant based transmission, the third target receiving power is taken as the first target receiving power.

For another example, when the UE specific target receiving power for calculating the virtual power headroom is provided or configured for the non-dynamic grant transmission, the second target receiving power is taken as the first target receiving power; when the UE specific target receiving power for calculating the virtual power headroom is not provided or configured for the dynamic grant based transmission, the fourth target receiving power is taken as the first target receiving power.

In an embodiment of the present disclosure, the provision of parameters and the configuration of the parameters may be equally substituted.

The fourth target receiving power may also be a default value, or a power value of MSG1 (preamble) in a random access process, or target receiving power of MSG1, i.e., PREAMBLE_RECEIVED_TARGET_POWE.

Figure 14:
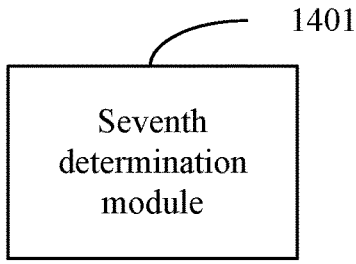
FIG. 14 is a schematic diagram of a structural composition of a device for determining target receiving power proposed by another embodiment of the present disclosure.

Referring to FIG. 14, another embodiment of the present disclosure proposes a device for determining target receiving power. The device includes a seventh determination module 1401. The seventh determination module 1401 is configured to determine a first target receiving power according to at least one of a second target receiving power, a third target receiving power, or a fourth target receiving power.

The first target receiving power is a cell specific target receiving power for calculating a virtual power headroom. The second target receiving power is a cell specific target receiving power configured for a non-dynamic grant transmission. The third target receiving power is a cell specific target receiving power configured for a dynamic grant based transmission. The fourth target receiving power is a cell specific target receiving power of a physical uplink shared channel transmission of a message three The Msg3 PUSCH transmission is a transmission of a third message in an uplink random access process, and the cell specific target receiving power of the Msg3 PUSCH transmission is composed of two parts: a preamble received target receiving power, i.e., preamble Received TargetPower, and a difference value between the Msg3 and the preamble, i.e., msg3-DeltaPreamble. Both parts are configured by a high layer parameter.

The first target receiving power described above is the cell specific target receiving power for calculating the virtual power headroom, and may also be described as a cell specific target receiving power of a power control parameter used by the UE for calculating the PHR of the type 1 according to a reference PUSCH transmission.

In an embodiment of the present disclosure, the seventh determination module 1401 is specifically configured to determine the first target receiving power according to the second target receiving power by adopting following manner: the second target receiving power is taken as the first target receiving power.

In an embodiment of the present disclosure, the seventh determination module 1401 is specifically configured to determine the first target receiving power according to the third target receiving power by adopting following manners: the third target receiving power is taken as the first target receiving power.

In an embodiment of the present disclosure, the seventh determination module 1401 is specifically configured to determine the first target receiving power according to the fourth target receiving power by adopting following manners: the fourth target receiving power is taken as the first target receiving power.

In an embodiment of the present disclosure, the seventh determination module 1401 is specifically configured to determine the first target receiving power by adopting at least one of following manners: when the second target receiving power is provided or configured, the second target receiving power is taken as the first target receiving power; when the second target receiving power is not provided or configured, the third target receiving power is taken as the first target receiving power; when the second target receiving power is not provided or configured, the fourth target receiving power is taken as the first target receiving power; when the third target receiving power is provided or configured, the third target receiving power is taken as the first target receiving power; when the third target receiving power is not provided or configured, the second target receiving power is taken as the first target receiving power; or when the third target receiving power is not provided or configured, the fourth target receiving power is taken as the first target receiving power.

In an embodiment of the present disclosure, the seventh determination module 1401 is specifically configured to determine the first target receiving power by adopting at least one of following manners: when a parameter (such as configuredGrantConfig) of the non-dynamic grant transmission is provided or configured, the second target receiving power is taken as the first target receiving power; when the parameter of the non-dynamic grant transmission is not provided or configured, the third target receiving power is taken as the first target receiving power; when the parameter of the non-dynamic grant transmission is not provided or configured, the fourth target receiving power is taken as the first target receiving power; when a parameter (such as PUSCH-Config) of the dynamic grant based transmission is provided or configured, the third target receiving power is taken as the first target receiving power; or when the parameter of the dynamic grant based transmission is not provided or configured, the fourth target receiving power is taken as the first target receiving power.

In an embodiment of the present disclosure, the seventh determination module 1401 is specifically configured to determine the first target receiving power by adopting at least one of following manners: when a UE specific target receiving power for calculating the virtual power headroom is provided or configured for the dynamic grant based transmission, the third target receiving power is taken as the first target receiving power; when the UE specific target receiving power for calculating the virtual power headroom is not provided or configured for the dynamic grant based transmission, the second target receiving power is taken as the first target receiving power; when the UE specific target receiving power for calculating the virtual power headroom is not provided or configured for the dynamic grant based transmission, the fourth target receiving power is taken as the first target receiving power; when the UE specific target receiving power for calculating the virtual power headroom is provided or configured for the non-dynamic grant transmission, the second target receiving power is taken as the first target receiving power; when the UE specific target receiving power for calculating the virtual power headroom is not configured for the non-dynamic grant transmission, the third target receiving power is taken as the first target receiving power; or when the UE specific target receiving power for calculating the virtual power headroom is not provided or configured for the non-dynamic grant transmission, the fourth target receiving power is taken as the first target receiving power.

The specific implementation process of the device for the target receiving power described above is the same as the specific implementation process of the method for the target receiving power in the previous embodiments, which will not be repeated here.

Another embodiment of the present disclosure provides a device for determining target receiving power. The device includes a processor and a computer readable storage medium. The computer readable storage medium has instructions stored therein, and the instructions, when executed by the processor, implement any one of the methods for determining the target receiving power described above.

Another embodiment of the present disclosure provides a computer readable storage medium. A computer program is stored on the computer readable storage medium. The computer program, when executed by a processor, implements steps of the method for determining the target receiving power described above.

Those of ordinary skill in the art will appreciate that functional modules/units in all or some of the steps, systems, devices of the methods disclosed above may be implemented as software, firmware, hardware, and suitable combinations thereof. The division between functional modules/units mentioned in the above description does not necessarily correspond to the division of physical assemblies in a hardware implementation manner; for example, one physical assembly may have multiple functions, or one function or step may be performed cooperatively by multiple physical assemblies. Some or all of the assemblies may be implemented as software executed by a processor, such as a digital signal processor or a microprocessor, or as hardware, or as an integrated circuit, such as an application specific integrated circuit. Such software may be distributed over a computer readable medium which may include a computer storage medium (or non-transitory medium) and a communication medium (or transitory medium). As is well known to those of ordinary skill in the art, the term "computer storage medium" includes a volatile and nonvolatile medium, a removable and non-removable medium implemented in any method or technology for storage of information (such as a computer readable instruction, a data structure, a program module or other data). The computer storage medium includes, but is not limited to, an RAM, an ROM, an EEPROM, a flash memory or other memory technology, a CD-ROM, a digital versatile disk (DVD) or other optical disk storage, a magnetic cassette, a magnetic tape, magnetic disk storage or other magnetic storage devices, or any other medium which may be used for storing the desired information and may be accessed by a computer. Further, it is well known to those of ordinary skill in the art that a communication medium typically contains a computer readable instruction, a data structure, a program module, or other data in a modulated data signal, such as a carrier wave or other transport mechanism, and may include any information delivery media.

Although the implementation manners disclosed in the embodiments of the present disclosure are as described above, the content described is merely the implementation manners used to facilitate the understanding of the embodiments of the present disclosure, and is not intended to limit the embodiments of the present disclosure.

What is claimed is:

1. A method for determining target receiving power, comprising:
    determining a first target receiving power according to a second target receiving power;
    wherein the first target receiving power is a cell specific target receiving power for calculating a virtual power headroom and the second target receiving power is a cell specific target receiving power of a physical uplink shared channel transmission of a message three, and
    wherein the second target receiving power comprises a preamble received target receiving power and a difference value between a Msg3 and the preamble.

2. The method of claim 1, further comprising: taking the second target receiving power as the first target receiving power.

3. A device for determining target receiving power, comprising a processor and a non-transitory computer readable storage medium, wherein the computer readable storage medium has instructions stored therein, the instructions, when executed by the processor, implement the method of claim 2.

4. A non-transitory computer readable storage medium, storing a computer program, wherein the computer program, when executed by a processor, implements the method of claim 2.

5. The method of claim 1, wherein the first target receiving power is further determined according to a third target receiving power, the third target receiving power being a cell specific target receiving power configured for a dynamic grant based transmission.

6. The method of claim 5, further comprising: taking the third target receiving power as the first target receiving power.

7. A device for determining target receiving power, comprising a processor and a non-transitory computer readable storage medium, wherein the computer readable storage medium has instructions stored therein, the instructions, when executed by the processor, implement the method of claim 6.

8. A non-transitory computer readable storage medium, storing a computer program, wherein the computer program, when executed by a processor, implements the method of claim 6.

9. A device for determining target receiving power, comprising a processor and a non-transitory computer readable storage medium, wherein the computer readable storage medium has instructions stored therein, the instructions, when executed by the processor, implement the method of claim 5.

10. A non-transitory computer readable storage medium, storing a computer program, wherein the computer program, when executed by a processor, implements the method of claim 5.

11. The method of claim 1, wherein the first target receiving power is further determined according to a fourth target receiving power, the fourth target receiving power being a cell specific target receiving power configured for a non-dynamic grant transmission.

12. The method of claim 11, further comprising: taking the fourth target receiving power as the first target receiving power.

13. A device for determining target receiving power, comprising a processor and a non-transitory computer readable storage medium, wherein the computer readable storage medium has instructions stored therein, the instructions, when executed by the processor, implement the method of claim 12.

14. A non-transitory computer readable storage medium, storing a computer program, wherein the computer program, when executed by a processor, implements the method of claim 12.

15. A device for determining target receiving power, comprising a processor and a non-transitory computer readable storage medium, wherein the computer readable storage medium has instructions stored therein, the instructions, when executed by the processor, implement the method of claim 11.

16. A non-transitory computer readable storage medium, storing a computer program, wherein the computer program, when executed by a processor, implements the method of claim 11.

17. A device for determining target receiving power, comprising a processor and a non-transitory computer readable storage medium, wherein the computer readable storage medium has instructions stored therein, the instructions, when executed by the processor, implement the method of claim 1.

18. A non-transitory computer readable storage medium, storing a computer program, wherein the computer program, when executed by a processor, implements the method of claim 1.

* * * * *